US012607505B2

(12) United States Patent
Yamada et al.

(10) Patent No.: US 12,607,505 B2
(45) Date of Patent: Apr. 21, 2026

(54) COLOR MEASUREMENT APPARATUS

(71) Applicant: SEIKO EPSON CORPORATION,
Tokyo (JP)

(72) Inventors: Katsumi Yamada, Matsumoto (JP);
Takeshi Tokuda, Shiojiri (JP); **Masaki
Ito**, Fujimi-machi (JP)

(73) Assignee: SEIKO EPSON CORPORATION,
Tokyo (JP)

( * ) Notice: Subject to any disclaimer, the term of this
patent is extended or adjusted under 35
U.S.C. 154(b) by 152 days.

(21) Appl. No.: 18/598,615

(22) Filed: Mar. 7, 2024

(65) Prior Publication Data

US 2024/0302208 A1    Sep. 12, 2024

(30) Foreign Application Priority Data

Mar. 8, 2023    (JP) ................................. 2023-035678

(51) Int. Cl.
*G01J 3/02*        (2006.01)
*G01J 3/06*        (2006.01)
*G01J 3/46*        (2006.01)

(52) U.S. Cl.
CPC ........... *G01J 3/0202* (2013.01); *G01J 3/0291*
(2013.01); *G01J 3/06* (2013.01); *G01J 3/46*
(2013.01); *G01J 2003/061* (2013.01)

(58) Field of Classification Search
CPC .. G01J 2003/061; G01J 3/0202; G01J 3/0267;
G01J 3/027; G01J 3/0289; G01J 3/06;
G01J 3/50; G01J 3/524; H04N 1/6044
See application file for complete search history.

(56) References Cited

U.S. PATENT DOCUMENTS

| | | | |
|---|---|---|---|
| 3,886,371 A | 5/1975 | Lloyd | |
| 10,406,819 B2 | 9/2019 | Fukuda et al. | |
| 2002/0054292 A1 | 5/2002 | Orelli et al. | |
| 2007/0151830 A1 | 7/2007 | Kawamata | |
| 2008/0174763 A1 | 7/2008 | Ehbets et al. | |
| 2012/0253727 A1 | 10/2012 | Lianza et al. | |
| 2020/0070539 A1* | 3/2020 | Kobayashi ............. | B41J 2/2103 |

FOREIGN PATENT DOCUMENTS

| | | | |
|---|---|---|---|
| EP | 2691238 A1 | 2/2014 | |
| JP | H08327455 A | 12/1996 | |
| JP | 2000241248 A | 9/2000 | |
| JP | 2016212001 B | 8/2017 | |
| WO | WO-2016181721 A1 * | 11/2016 | ................ G01J 3/50 |

OTHER PUBLICATIONS

Non-Final Office Action for U.S. Appl. No. 18/595,942, issued on
Aug. 22, 2025.

* cited by examiner

*Primary Examiner* — Hina F Ayub
(74) *Attorney, Agent, or Firm* — CHIP LAW GROUP

(57)        ABSTRACT

A color measurement apparatus to which a colorimeter that
measures a color of a color measurement target is configured
to be attached in a state in which a color measurement
portion is in contact with the color measurement target,
includes a carriage that supports the colorimeter, and a
scanning mechanism portion that causes the carriage to
perform scanning, in which the carriage supports the colo-
rimeter such that the color measurement portion protrudes
from a bottom surface of the carriage in a protruding
direction toward the color measurement target in a state in
which the colorimeter is supported.

18 Claims, 19 Drawing Sheets

FIG. 14

COLOR MEASUREMENT APPARATUS

The present application is based on, and claims priority from JP Application Serial Number 2023-035678, filed Mar. 8, 2023, the disclosure of which is hereby incorporated by reference herein in its entirety.

BACKGROUND

1. Technical Field

The present disclosure relates to a color measurement apparatus.

2. Related Art

In the related art, various color measurement apparatuses that measure a color of a color measurement target are used. For example, JP-A-2000-241248 discloses a color measurement apparatus that measures a color of an image receiving paper by pressing a cover, which is a color measurement portion, against the image receiving paper, which is a color measurement target, to keep a distance from the image receiving paper constant. In addition, JP-A-2016-212001 discloses an automatic color measurement apparatus in which a colorimeter that is a color measurement portion performs color measurement in a non-contact state with respect to a color chart that is a color measurement target, and a configuration in which the colorimeter is attachable and detachable with respect to the automatic color measurement apparatus.

However, in the color measurement apparatus such as the automatic color measurement apparatus of JP-A-2016-212001, in which the color measurement portion performs color measurement in a non-contact state with respect to the color measurement target, there is a concern that extraneous light enters the gap between the color measurement portion and the color measurement target and the color measurement accuracy deteriorates. In addition, in the color measurement apparatus of JP-A-2000-241248, since a cover that is a color measurement portion is fixed to the color measurement apparatus and the cover fixed to the color measurement apparatus is pressed against the image receiving paper, there is a concern that the cover damages the image receiving paper.

SUMMARY

According to an aspect of the present disclosure, there is provided a color measurement apparatus to which a colorimeter that measures a color of a color measurement target is configured to be attached in a state in which a color measurement portion is in contact with the color measurement target, including a carriage that supports the colorimeter, and a scanning mechanism portion that causes the carriage to perform scanning, in which the carriage supports the colorimeter such that the color measurement portion protrudes from a bottom surface of the carriage in a protruding direction toward the color measurement target in a state in which the colorimeter is supported.

BRIEF DESCRIPTION OF THE DRAWINGS

FIG. 14 is a side view illustrating the color measurement apparatus according to the example of the present disclosure, and is a view illustrating a state in which the colorimeter of FIG. 1 is accommodated.

DESCRIPTION OF EMBODIMENTS

Figure 1:
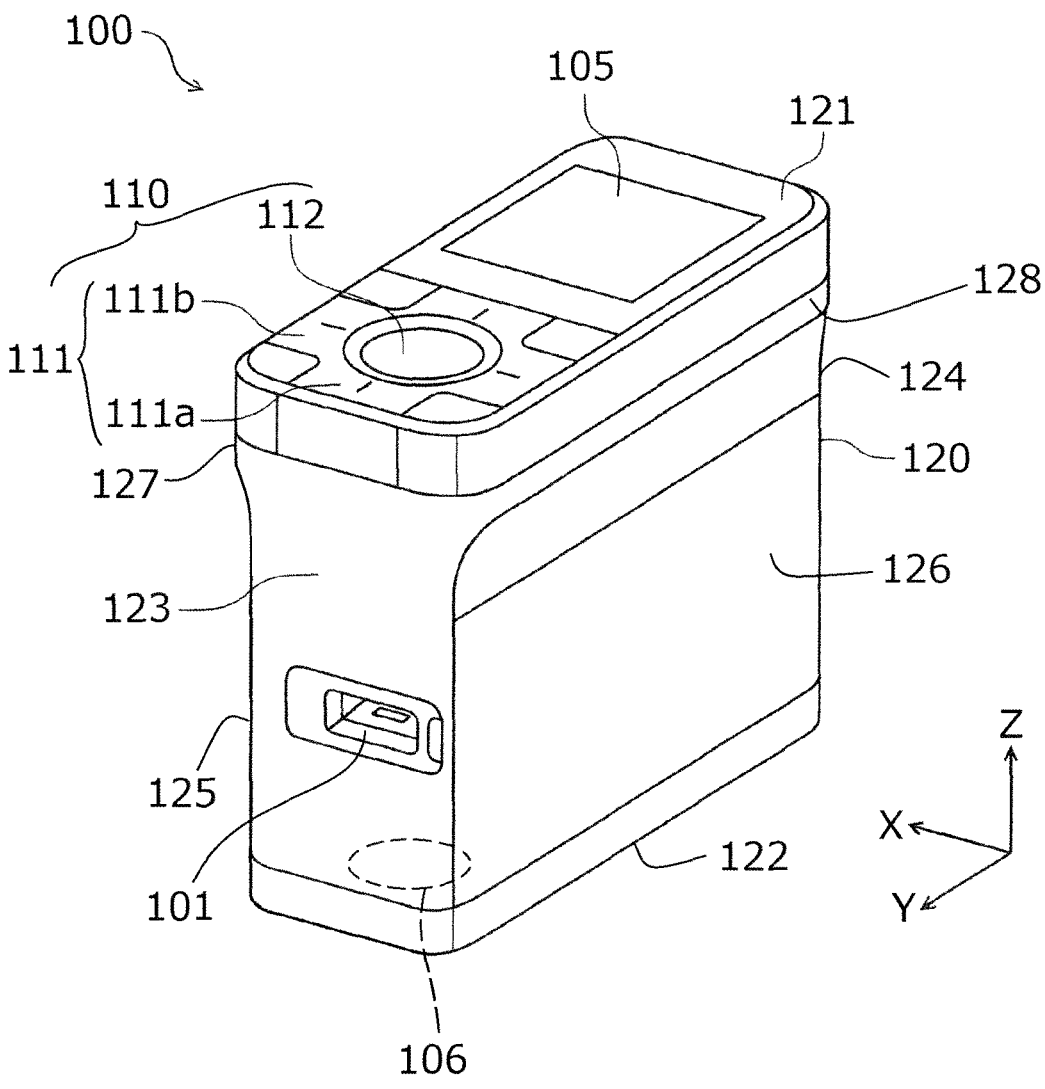
FIG. 1 is a schematic perspective view of a colorimeter that can be used in a color measurement apparatus according to an example of the present disclosure.

Hereinafter, the present disclosure will be schematically described.

A color measurement apparatus according to a first aspect is a color measurement apparatus to which a colorimeter that measures a color of a color measurement target is configured to be attached in a state in which a color measurement portion is in contact with the color measurement target, including a carriage that supports the colorimeter, and a scanning mechanism portion that causes the carriage to perform scanning, in which the carriage supports the colorimeter such that the color measurement portion protrudes from a bottom surface of the carriage in a protruding direction toward the color measurement target in a state in which the colorimeter is supported.

According to the present aspect, there is provided the color measurement apparatus to which a colorimeter that measures a color of a color measurement target is configured to be attached in a state in which a color measurement portion is in contact with the color measurement target, so that external light can be suppressed from entering through the gap between the color measurement portion and the color measurement target, and a decrease in color measurement accuracy can be suppressed. In addition, the carriage supports the colorimeter such that the color measurement portion protrudes from a bottom surface of the carriage in a protruding direction toward the color measurement target in a state in which the colorimeter is supported. That is, since the colorimeter can be supported without being fixed to the carriage, the impact generated when the color measurement portion comes into contact with the color measurement target can be attenuated, and the color measurement portion can be suppressed from damaging the color measurement target.

Next, the color measurement apparatus according to a second aspect is an aspect involved in the first aspect, in which the colorimeter is supported by the carriage in a state in which a portion of the colorimeter is placed on a portion of the carriage by its own weight, and, by application of a force to the color measurement portion from an opposite direction with respect to the protruding direction, the colorimeter is configured to be movable in the opposite direction with respect to the carriage.

According to the present aspect, the colorimeter is supported by the carriage in a state in which a portion of the colorimeter is placed on a portion of the carriage by its own weight, and, by application of a force to the color measurement portion from an opposite direction with respect to the protruding direction, the colorimeter is configured to be movable in the opposite direction with respect to the carriage. Therefore, the colorimeter can be supported by the carriage by its own weight of the colorimeter, so that the impact generated when the color measurement portion comes into contact with the color measurement target can be effectively attenuated, and the color measurement portion can be effectively suppressed from damaging the color measurement target.

Next, the color measurement apparatus according to a third aspect is an aspect involved in the first or second aspect, in which the bottom surface of the carriage is separated from the color measurement target in a state in which the color measurement portion measures a color of the color measurement target.

According to the present aspect, the bottom surface of the carriage is separated from the color measurement target in a state in which the color measurement portion measures a color of the color measurement target. Therefore, the weight of the carriage is not transmitted to the color measurement target in a state in which the color measurement portion measures the color of the color measurement target. Therefore, the impact generated when the color measurement portion comes into contact with the color measurement target can be effectively attenuated, and the color measurement portion can be particularly effectively suppressed from damaging the color measurement target. In a state in which the color measurement portion measures the color of the color measurement target, the color measurement portion is in contact with the color measurement target. Therefore, since a predetermined load due to its own weight of the colorimeter is applied to the color measurement target, the positional deviation of the color measurement target can be suppressed.

Next, the color measurement apparatus according to a fourth aspect is an aspect involved in any one of the first to third aspects, in which a length of the carriage is shorter than a length of the colorimeter in a direction along the protruding direction.

According to the present aspect, a length of the carriage is shorter than a length of the colorimeter in a direction along the protruding direction. Therefore, the length of the carriage in the direction along the protruding direction can be shortened, and the entirety of the color measurement apparatus can be miniaturized in the direction along the protruding direction.

Next, the color measurement apparatus according to a fifth aspect is an aspect involved in any one of the first to fourth aspects, in which the carriage is in contact with a first side surface of the colorimeter and a second side surface that faces the first side surface to support the colorimeter.

According to the present aspect, the carriage is in contact with a first side surface and a second side surface of the colorimeter to support the colorimeter. Therefore, the positional deviation of the colorimeter in a direction intersecting the protruding direction, with respect to the carriage can be suppressed by the first side surface and the second side surface.

Next, the color measurement apparatus according to a sixth aspect is an aspect involved in the fifth aspect, in which the carriage includes a rib that protrudes toward the first side surface and the second side surface.

According to the present aspect, the carriage includes a rib that protrudes toward the first side surface and the second side surface. By providing such ribs, the positional deviation of the colorimeter in a direction intersecting the protruding direction, with respect to the carriage can be effectively suppressed.

Next, the color measurement apparatus according to a seventh aspect is an aspect involved in the fifth or sixth aspect, in which the carriage supports a projection portion that is provided on the first side surface and the second side surface and protrudes toward an outside of the colorimeter.

According to the present aspect, the carriage supports a projection portion that is provided on the first side surface and the second side surface and protrudes toward an outside of the colorimeter. With such a configuration, the colorimeter can be stably supported in the protruding direction.

Next, the color measurement apparatus according to an eighth aspect is an aspect involved in any one of the first to seventh aspects, in which the carriage includes a first measurement portion and a second measurement portion that measure the color measurement target, and the first measurement portion and the second measurement portion are provided to sandwich the color measurement portion.

According to the present aspect, the carriage includes a first measurement portion and a second measurement portion that measure the color measurement target, and the first measurement portion and the second measurement portion are provided to sandwich the color measurement portion. With such a configuration, a position of the colorimeter with respect to a position of the color measurement target can be specified by measuring a measured portion of the color measurement target by the first measurement portion and the second measurement portion. In addition, the first measurement portion and the second measurement portion are provided to sandwich the color measurement portion, so that a scanning range of the carriage can be reduced by, for example, efficiently measuring a plurality of the measured portions by either the first measurement portion or the second measurement portion.

Next, the color measurement apparatus according to a ninth aspect is an aspect involved in any one of the first to eighth aspects, and includes a first cover that constitutes an outer surface of the color measurement apparatus and is configured to fix the first measurement portion.

According to the present aspect, a first cover that constitutes an outer surface of the color measurement apparatus and is configured to fix the first measurement portion is included. Therefore, the first cover can protect the first measurement portion when composing the outer surface of the color measurement apparatus. That is, since one member has two jobs, the number of members can be reduced as compared with the configuration in which separate members are provided.

Next, the color measurement apparatus according to a tenth aspect is an aspect involved in the ninth aspect, in which the first cover is configured to hold a cable coupled to the colorimeter.

According to the present aspect, the first cover is configured to hold a cable coupled to the colorimeter. Therefore, since the first measurement portion and the cable can be held by one member, the number of components can be reduced.

Next, the color measurement apparatus according to an eleventh aspect is an aspect involved in the tenth aspect, in which the first cover holds the first measurement portion and the cable to overlap the first measurement portion and the cable in a direction along the protruding direction.

According to the present aspect, the first cover holds the first measurement portion and the cable to overlap the first measurement portion and the cable in a direction along the protruding direction. In this manner, by disposing the first cover to overlap the first measurement portion and the cable in the direction along the protruding direction, the accommodation space of the first measurement portion can be reduced, and the carriage can be miniaturized.

Next, the color measurement apparatus according to a twelfth aspect is an aspect involved in any one of the first to eleventh aspects, and includes a cable coupling to the colorimeter, in which the carriage includes an opening portion through which the cable passes, and the cable is disposed to be displaceable with respect to the opening portion.

When one end side of the cable, which is the side coupled to the colorimeter, moves in accordance with the fluctuation of the colorimeter, a force is applied to the cable when the other end side of the cable is configured to be fixed. However, according to the present aspect, a cable coupling to the colorimeter is included, in which the carriage includes an opening portion through which the cable passes, and the cable is disposed to be displaceable with respect to the opening portion. Accordingly, although one end side of the cable moves in accordance with the fluctuation of the colorimeter, the cable is displaced with respect to the opening portion, so that a force applied to the cable can be escaped.

Next, the color measurement apparatus according to a thirteenth aspect is an aspect involved in any one of the first to twelfth aspects, in which the carriage includes an accommodation portion that accommodates an auxiliary member attached to the colorimeter.

According to the present aspect, the carriage includes an accommodation portion that accommodates an auxiliary member attached to the colorimeter. Therefore, for example, the colorimeter can be set in the carriage without removing the auxiliary member from the colorimeter, so that usability is improved.

Next, the color measurement apparatus according to a fourteenth aspect is an aspect involved in any one of the first to thirteenth aspects, in which the scanning mechanism portion is configured to be displaced between a state in which the color measurement portion is in contact with the color measurement target and a state in which the color measurement portion is not in contact with the color measurement target, and brings one end of the color measurement portion into contact with the color measurement target before the other end in a scanning direction in which the color measurement portion is caused to perform scanning during displacement from a state in which the color measurement portion is not in contact with the color measurement target to a state in which the color measurement portion is in contact with the color measurement target.

According to the present aspect, the scanning mechanism portion is configured to be displaced between a state in which the color measurement portion is in contact with the color measurement target and a state in which the color measurement portion is not in contact with the color measurement target, and brings one end of the color measurement portion into contact with the color measurement target before the other end in a scanning direction in which the color measurement portion is caused to perform scanning during displacement from a state in which the color measurement portion is not in contact with the color measurement target to a state in which the color measurement portion is in contact with the color measurement target. With such a configuration, an impact sound generated when the colorimeter is in contact with the color measurement target can be reduced.

Hereinafter, the present disclosure will be specifically described.

An X-Y-Z coordinate system illustrated in each drawing is an orthogonal coordinate system, an X-Y plane is a horizontal plane, and an X-Z plane and a Y-Z plane are vertical planes. Here, a Z-axis direction is a vertical direction and corresponds to a placement direction of a colorimeter 100, a +Z direction is a vertically upward direction, and a –Z direction is a vertically downward direction. The –Z direction corresponds to a protruding direction in which a color measurement surface 122 corresponding to a color measurement portion of the colorimeter 100 is directed from a bottom surface 302 of the carriage 30 toward the color chart 10 as a color measurement target. In addition, the X-axis direction is a horizontal direction orthogonal to the Z-axis direction that is a vertical direction. In addition, the Y-axis direction is a horizontal direction and is a direction orthogonal to both the X-axis direction and the Z-axis direction. In the following description, the +Y direction side of a color measurement apparatus 1 is referred to as the rear direction side, the –Y direction side of the color measurement apparatus 1 is referred to as the front direction side, the +X direction side of the color measurement apparatus 1 is referred to as the right direction side, and the –X direction side of the color measurement apparatus 1 is referred to as the left direction side.

Figure 2:
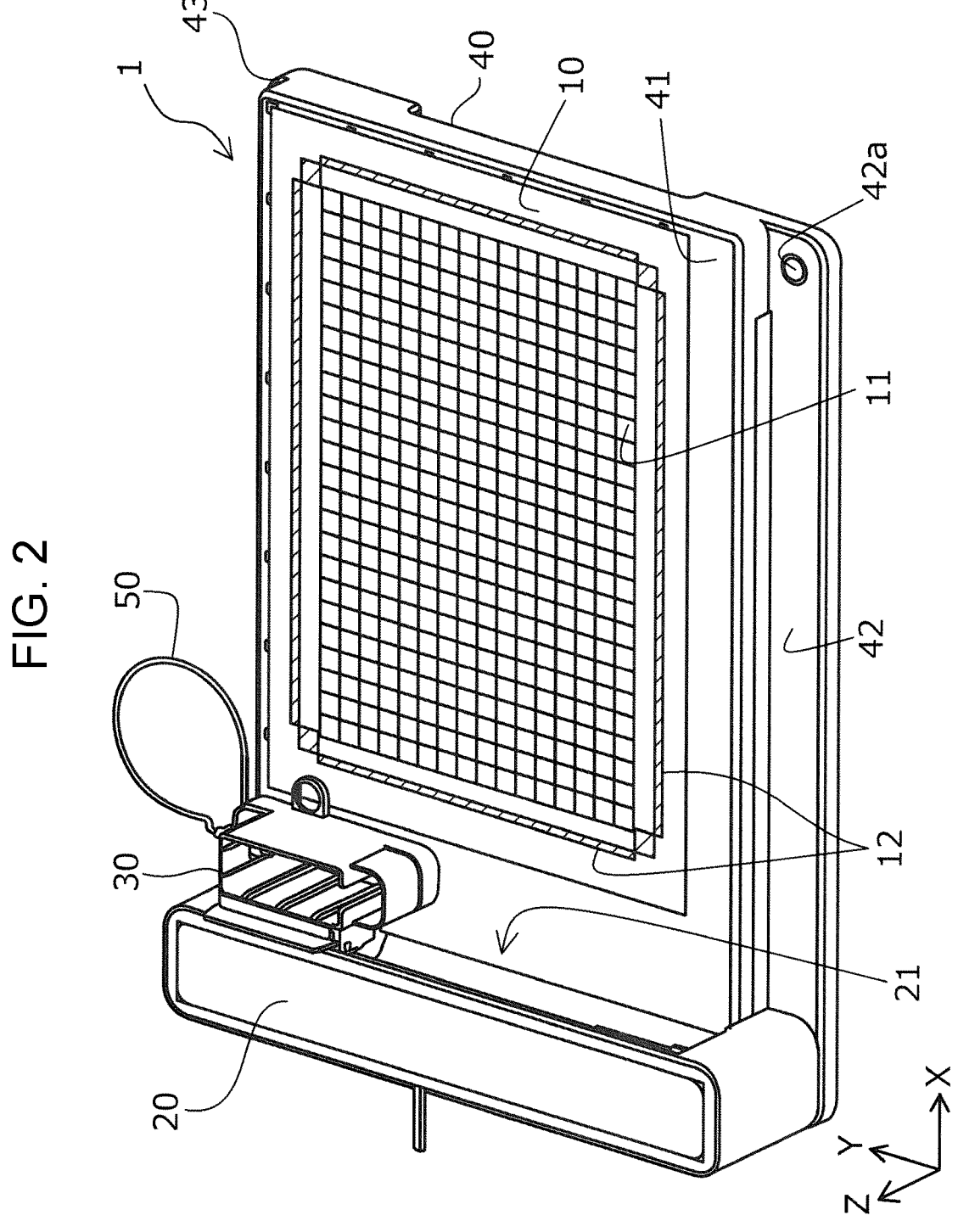
FIG. 2 is a perspective view of the color measurement apparatus according to the example of the present disclosure.

First, with reference to FIG. 1, an example of the colorimeter 100 that can be used in the color measurement apparatus 1 according to an example of the present disclosure will be described. The colorimeter 100 according to the present example includes a color measurement port 106, and is an optical device that emits light in the –Z direction from the color measurement port 106 and performs color measurement by receiving light reflected by a color chart 10, which is a color measurement target, as illustrated in FIG. 2. In other words, the optical axis direction is the Z-axis direction, and the position of the optical axis corresponds to the position of the color measurement port 106.

The colorimeter 100 according to the present example includes a casing 120 having an upper surface 121 that is a surface on the +Z direction side, a color measurement surface 122 that is a bottom surface on the –Z direction side and is provided with the color measurement port 106, a rear surface 123 that is a surface on the +Y direction side, a front surface 124 that is a surface on the –Y direction side, a right surface 125 that is a surface on the +X direction side, and a left surface 126 that is a surface on the –X direction side.

An operation portion 110 and a screen portion 105 are disposed on the upper surface 121 in the Y-axis direction. Specifically, the operation portion 110 is provided on the +Y direction side of the upper surface 121, and the screen portion 105 is provided on the –Y direction side of the upper surface 121. The operation portion 110 includes a plus-shaped button 111 configured with a bar shape 111a extending in the Y-axis direction and a bar shape 111b extending in the X-axis direction, and a determination button 112 provided at the center of the plus-shaped button 111. For example, a user moves the menus to be activated in front/rear and left/right directions by pressing the plus-shaped button 111 with respect to a plurality of menus displayed on the screen portion 105, and can determine the desired menu by pressing the determination button 112.

A terminal 101 to which a USB cable 50 illustrated in FIG. 2 or the like can be coupled is provided on the rear surface 123. In addition, the colorimeter 100 of the present example is provided with a projection portion 127 and a projection portion 128 that are projected toward the outside when viewed in the Y-axis direction. Specifically, the projection portion 127 is provided in an area on the +Z direction side as compared with the center portion of the right surface 125 in the Z-axis direction, and the projection portion 128 is provided in an area on the +Z direction side as compared with the center portion of the left surface 126 in the Z-axis direction.

Next, a detailed configuration of the color measurement apparatus 1 according to the example of the present disclosure will be described with reference to FIGS. 2 to 19. FIG. 2 illustrates a configuration of the color measurement apparatus 1 of the present example. The color measurement apparatus 1 includes a main body portion 40 having a support base 41 extending in the X-axis direction and the Y-axis direction, and further includes a gantry 20 extending in the Y-axis direction to cover a portion of the support base 41 from the +Z direction side.

A carriage 30 that can accommodate the colorimeter 100 is attached to the gantry 20. The gantry 20 can move in the X-axis direction with respect to the support base 41, and the carriage 30 can move in the Y-axis direction with respect to the gantry 20. These movements are also referred to as scanning. Here, the carriage 30 can move in the Y-axis direction with respect to the gantry 20, and can also move in the Z-axis direction with respect to the gantry 20. One end of the USB cable 50 is coupled to the gantry 20 and the other end of the USB cable 50 is coupled to the colorimeter 100 accommodated in the carriage 30.

The color chart 10, which is an example of a measurement target, can be placed on the support base 41, and the color chart 10 is composed by, for example, a plurality of color patches 11, a black frame 12, or the like. The color chart 10 is fixed to the support base 41 by, for example, attaching an adhesive tape at a periphery of the color chart 10, and corresponds to automatic color measurement up to A3 size, for example. However, since the gantry 20 has a gate shape when viewed from the X-axis direction and has a space portion 21 corresponding to the gate shape, a long paper that exceeds the A3 size can be also placed in the X-axis direction on the support base 41.

On the-Y direction side of the main body portion 40, a front surface 42 is provided at a position lower in the –Z direction side than the support base 41, and on the +Y direction side of the main body portion 40, a rear surface 43 is provided at a position lower in the –Z direction side than the support base 41. A power button 42a that is an example of an operation portion of the color measurement apparatus 1 is provided on the front surface 42.

Figure 3:
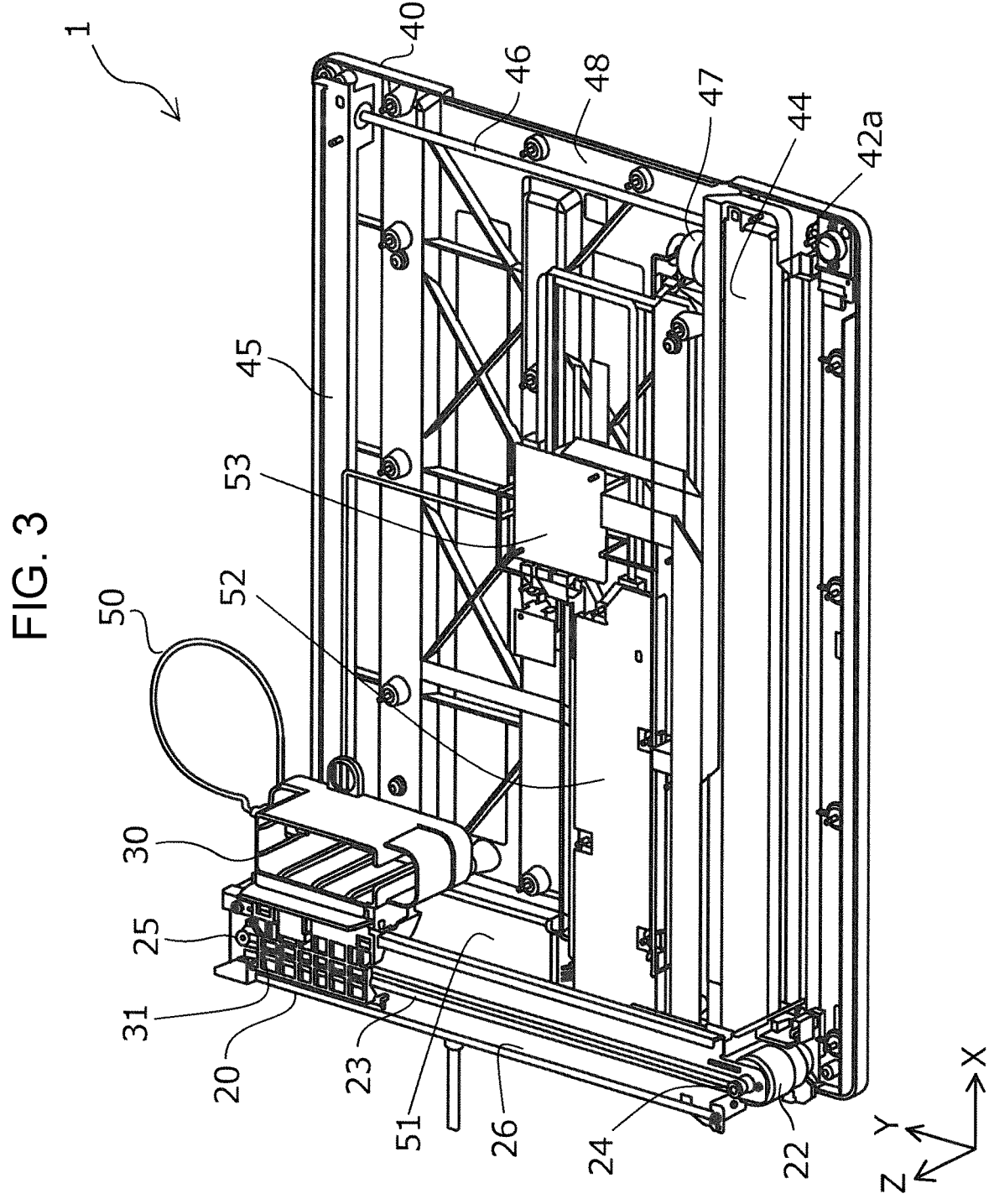
FIG. 3 is a perspective view illustrating an internal configuration of the color measurement apparatus according to the example of the present disclosure.

FIG. 3 illustrates an internal configuration of the color measurement apparatus 1, and is a view in which the exterior component of FIG. 2 is removed. On the +Z direction side above a case lower 48, the front frame 44 and the rear frame 45 are disposed to extend in the X-axis direction at an interval, and a gantry frame 26 having a gate shape and composing a portion of the gantry 20 moves in the X-axis direction along the front frame 44 and the rear frame 45.

The front frame 44 and the rear frame 45 are coupled by a coupling shaft 46 at a position on the +X direction side of the main body portion 40, and the rotational drive of a gantry motor 47 is transmitted from the gantry motor 47, which is a power source for moving the gantry 20 in the X-axis direction, to the coupling shaft 46 via a gear group (not illustrated). By the rotational drive transmitted to the coupling shaft 46, an endless belt (not illustrated) hung on a pulley (not illustrated) provided on the side of the front frame 44 that is the –Y direction side of the coupling shaft 46, and an endless belt (not illustrated) hung on a pulley (not illustrated) provided on the side of the rear frame 45 that is the +Y direction side of the coupling shaft 46 are rotated, and the gantry frame 26 coupled to the endless belts is moved.

A carriage motor 22 is fixed to the front side corresponding to the −Y direction side of the gantry frame 26, and an endless carriage belt 23 hung on a front pulley 24 and a back pulley 25 rotates via the front pulley 24 coupled to the carriage motor 22. A carriage slider 31, which composes a portion of the carriage 30, is fixed to the carriage belt 23, and moves along the Y-axis direction in accordance with the pivoting operation of the carriage belt 23 accompanying the pivoting operation of the carriage motor 22. Inside the main body portion 40, a main substrate 52, a sub-substrate 53, a power supply box 51, or the like as a control portion are provided.

Figure 4:
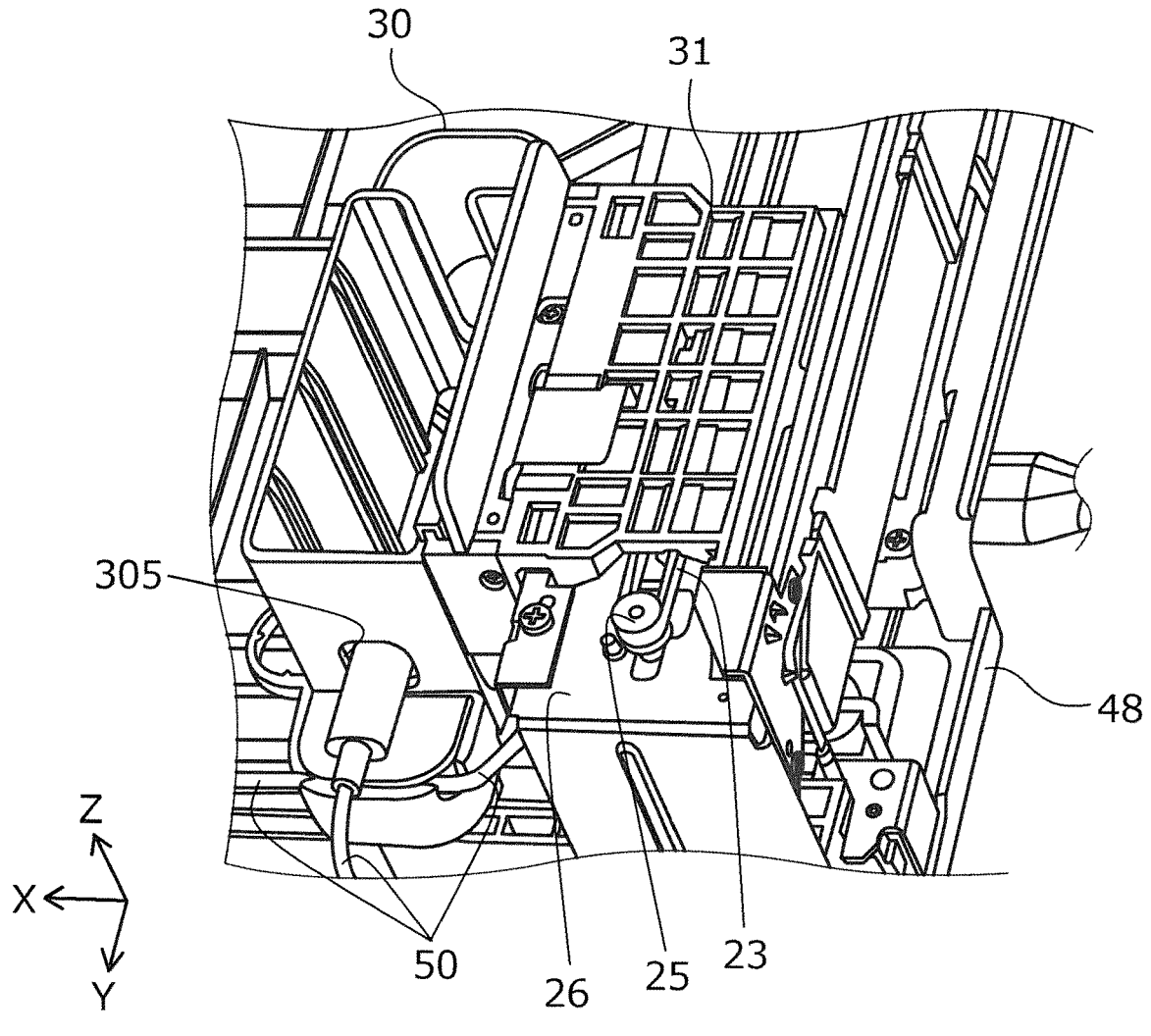
FIG. 4 is a perspective view of a periphery of a carriage of the color measurement apparatus according to the example of the present disclosure when viewed from above.
Figure 5:
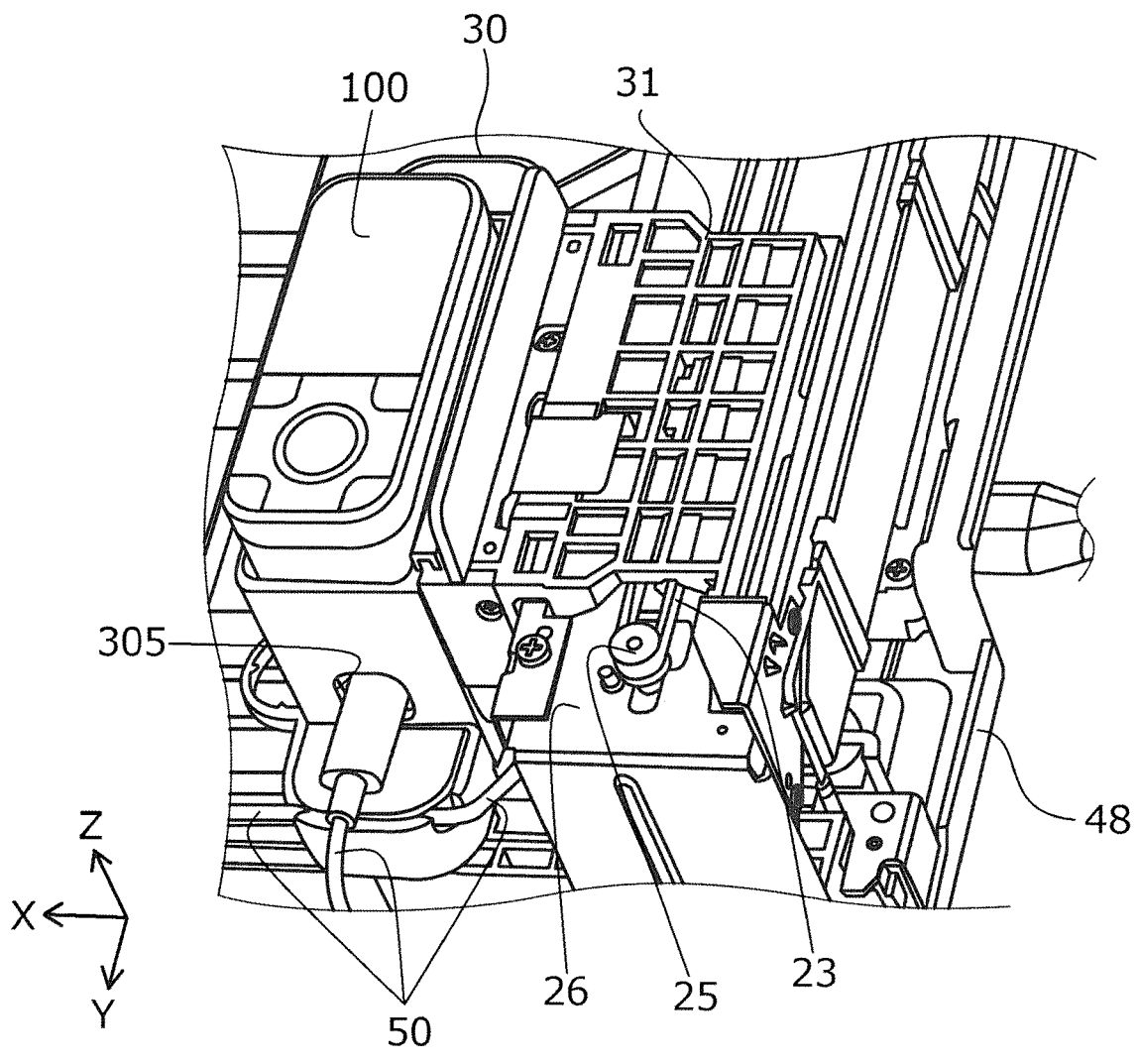
FIG. 5 is a perspective view of a periphery of the carriage of the color measurement apparatus according to the example of the present disclosure when viewed from above, and illustrates a state in which the colorimeter of FIG. 1 is accommodated.

FIGS. 4 and 5 are perspective views of the periphery of the carriage 30 as viewed from above, FIG. 4 is a view illustrating a state in which the colorimeter 100 is not accommodated in the carriage 30, and FIG. 5 is a view illustrating a state in which the colorimeter 100 is accommodated in the carriage 30. Here, the shape of the carriage 30 of the present example is determined assuming that the specific colorimeter 100 is used, but the shape of the carriage 30 may be changed according to the shape of the colorimeter 100 to be used.

Figure 6:
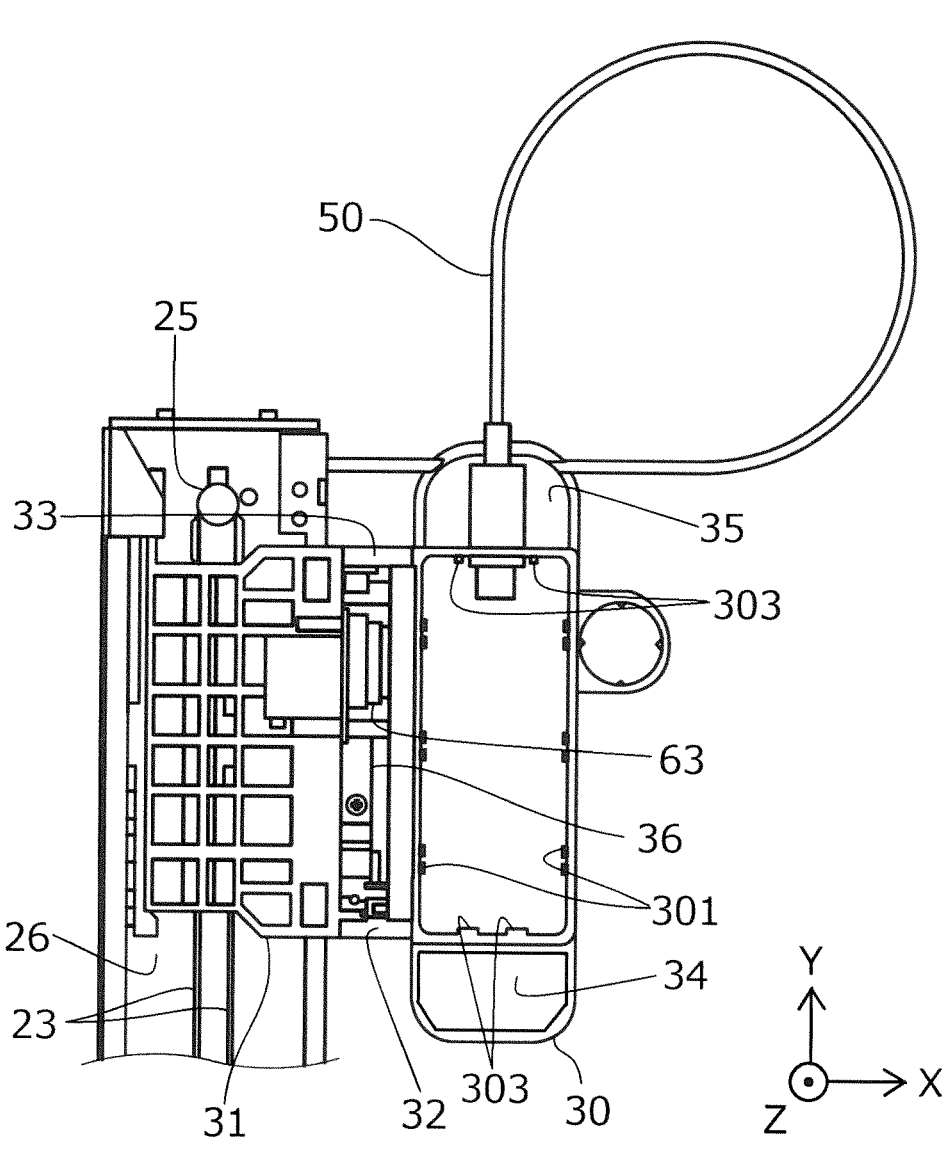
FIG. 6 is a plan view illustrating a periphery of the carriage of the color measurement apparatus according to the example of the present disclosure.
Figure 7:
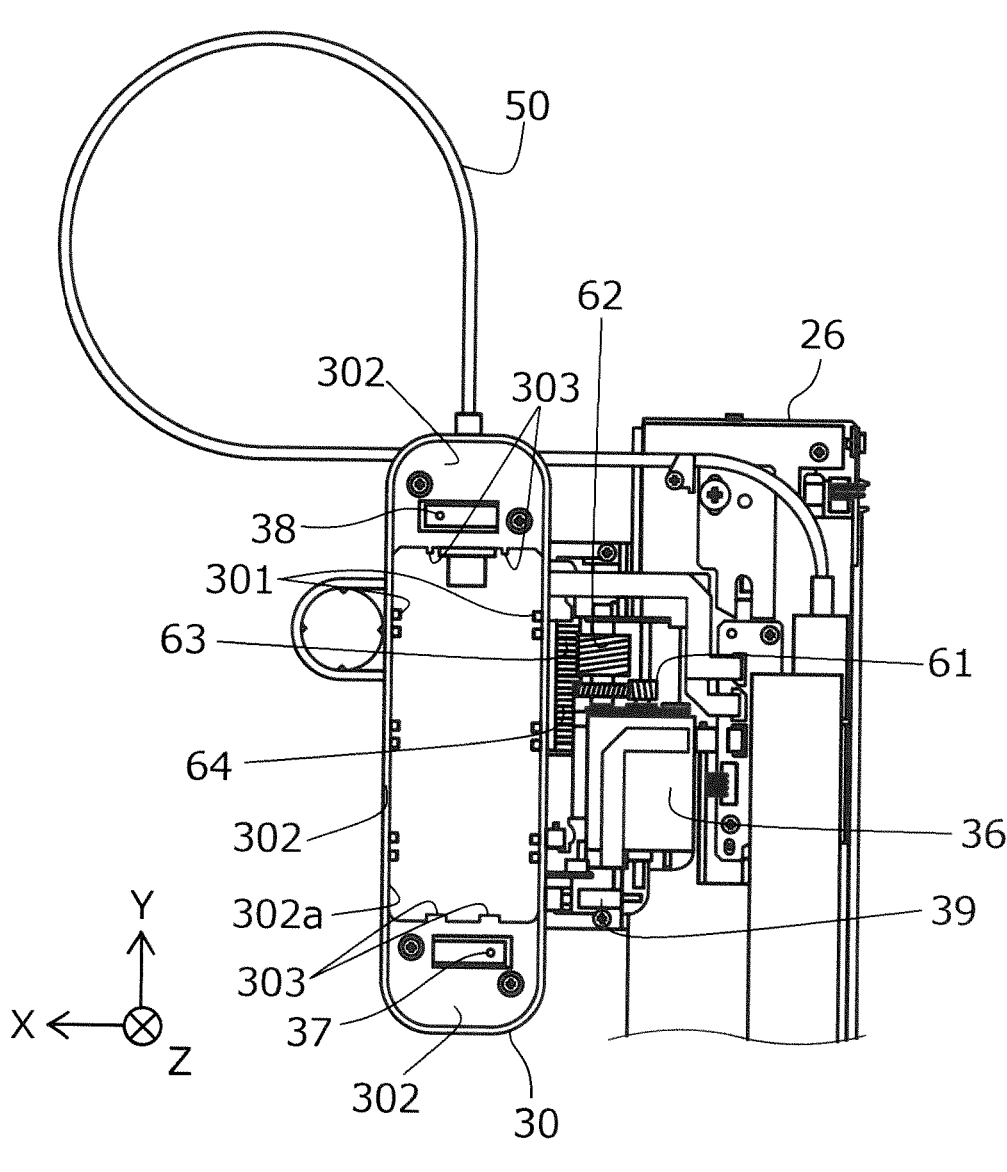
FIG. 7 is a bottom view illustrating a periphery of the carriage of the color measurement apparatus according to the example of the present disclosure.

FIG. 6 is a plan view illustrating the periphery of the carriage 30, and FIG. 7 is a bottom view illustrating the periphery of the carriage 30. The carriage slider 31 is coupled to a carriage guide front 32 and a carriage guide rear 33 to be fixed to an accommodation portion of the colorimeter 100. In the carriage 30, the power of the Z-axis movement direction movement motor 36, which is a drive source, is transmitted to the motor gear 61, the worm gear 62, the first driving gear 63, and the second driving gear 64 in this order, so that the carriage 30 slidably moves in the Z-axis direction with respect to the gantry 20 via the rack gear 65 illustrated in FIG. 8 or the like. In addition, as illustrated in FIG. 7, the carriage 30 is provided with a home position sensor 39 that measures whether or not the position of the carriage 30 in the Z-axis direction with respect to the gantry 20 is a home position.

As illustrated in FIG. 7, a front side sensor 37 and a rear side sensor 38 configured to measure a width of the measurement target are provided on a surface of the carriage 30 on the −Z direction side. In addition, as illustrated in FIG. 6, a front side cover 34 is disposed on the +Z direction side of the carriage 30 corresponding to a position at which the front side sensor 37 is disposed in the Z-axis direction, and a rear side cover 35 is disposed on the +Z direction side of the carriage 30 corresponding to a position at which the rear side sensor 38 is disposed in the Z-axis direction.

Figure 8:
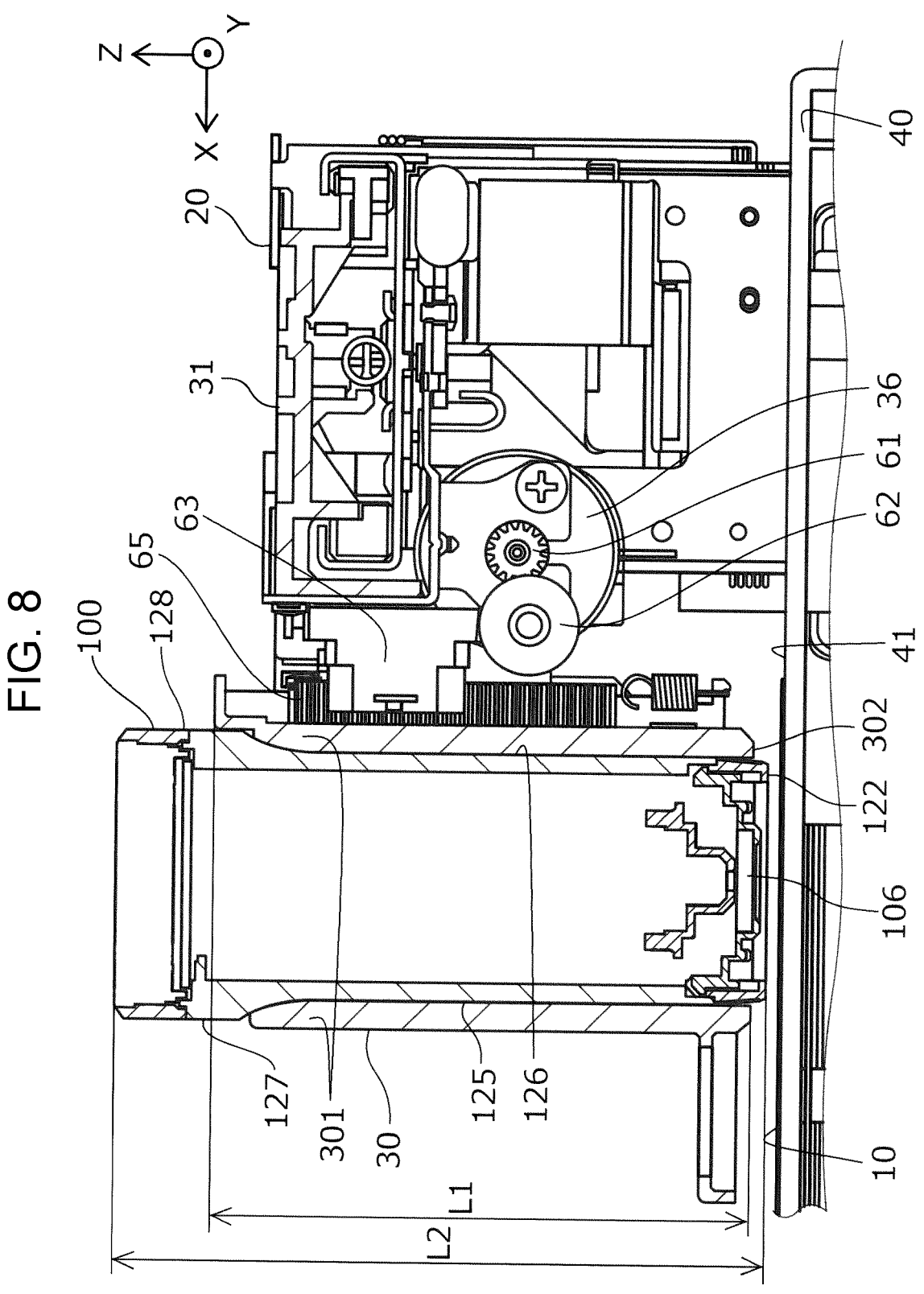
FIG. 8 is a rear view illustrating a periphery of the carriage of the color measurement apparatus according to the example of the present disclosure, and is a view illustrating a disposition when the colorimeter of FIG. 1 is accommodated and the carriage is caused to perform scanning.

Next, mainly with reference to FIGS. 8 to 12, the position of the carriage 30 in the Z-axis direction with respect to the gantry 20, that is, the position of the carriage 30 and the colorimeter 100 accommodated in the carriage 30 in the Z-axis direction with respect to the measurement target placed on the support base 41 will be described. FIG. 8 is a view illustrating a disposition when the carriage 30 performs scanning in a state in which the colorimeter 100 is accommodated in the carriage 30, that is, when the carriage 30 is moved along the Y-axis direction with respect to the gantry 20. At this time, both the color measurement surface 122 of the colorimeter 100 and a bottom surface 302 of the carriage 30 are in a state in which a gap is vacant in the Z-axis direction with respect to the color chart 10 that is a measurement target.

Figure 9:
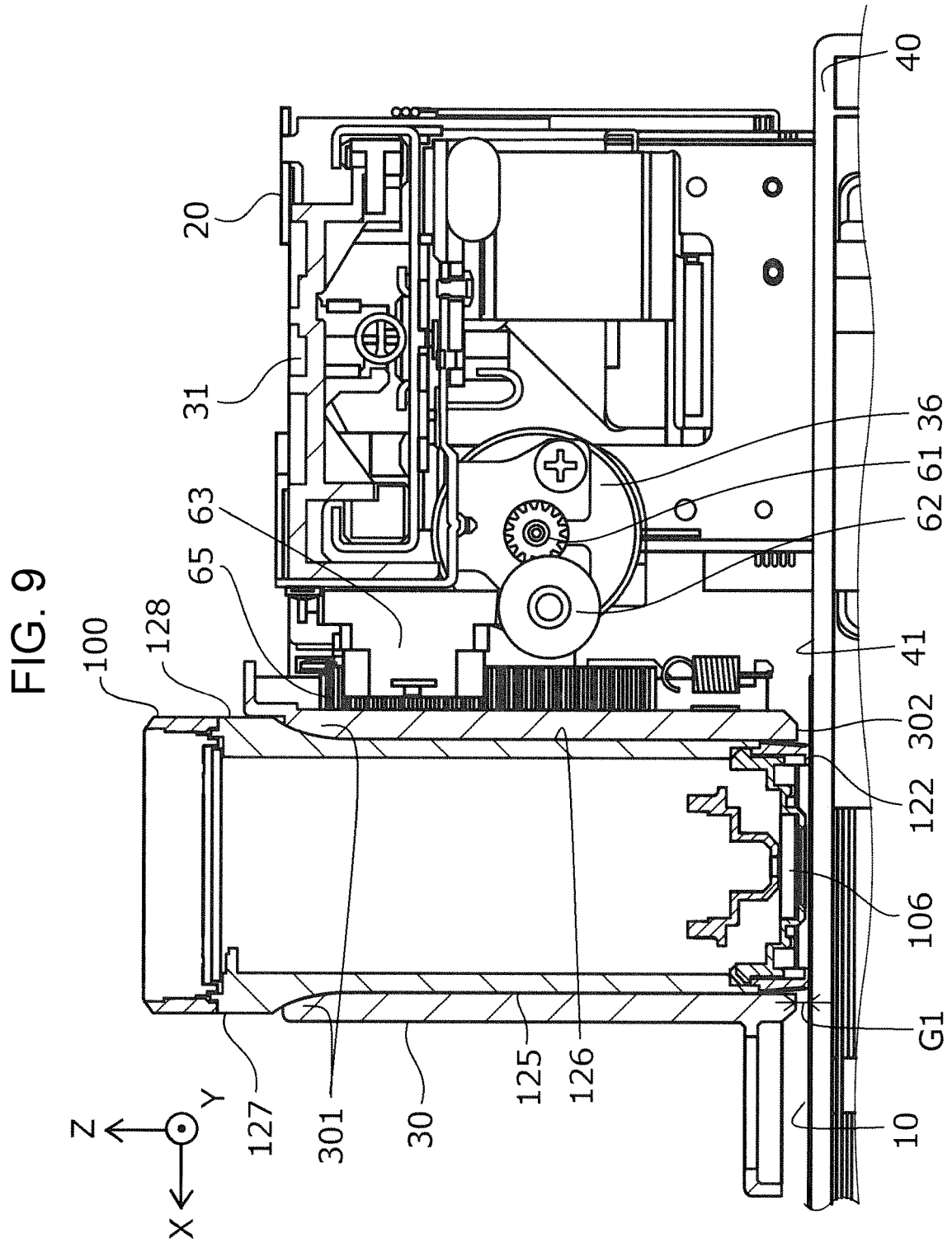
FIG. 9 is a rear view illustrating a periphery of the carriage of the color measurement apparatus according to the example of the present disclosure, and is a view illustrating a disposition at a moment at which the colorimeter of FIG. 1 is accommodated, the carriage is moved downward from the state of FIG. 8, and a color measurement portion comes into contact with a color measurement target.

FIG. 9 is a view illustrating a disposition at the moment at which the carriage is moved downward in the −Z direction from the state of FIG. 8 and the color measurement surface 122 of the colorimeter 100 comes into contact with the color chart 10. For example, in the present example, a gap G1 in the Z-axis direction between the bottom surface 302 of the carriage 30 and the color chart 10 at this time is 2 mm. Here, in the present example, the colorimeter 100 is accommodated in the carriage 30 in a state in which the projection portion 127 and the projection portion 128 are caught and placed by their own weight on a rib 301 provided in the carriage 30, and the color measurement surface 122 of the colorimeter 100 is configured to protrude in a protruding direction, that is, in the −Z direction from a hole portion 302a provided in the bottom surface 302 of the carriage 30 illustrated in FIG. 7.

Figure 10:
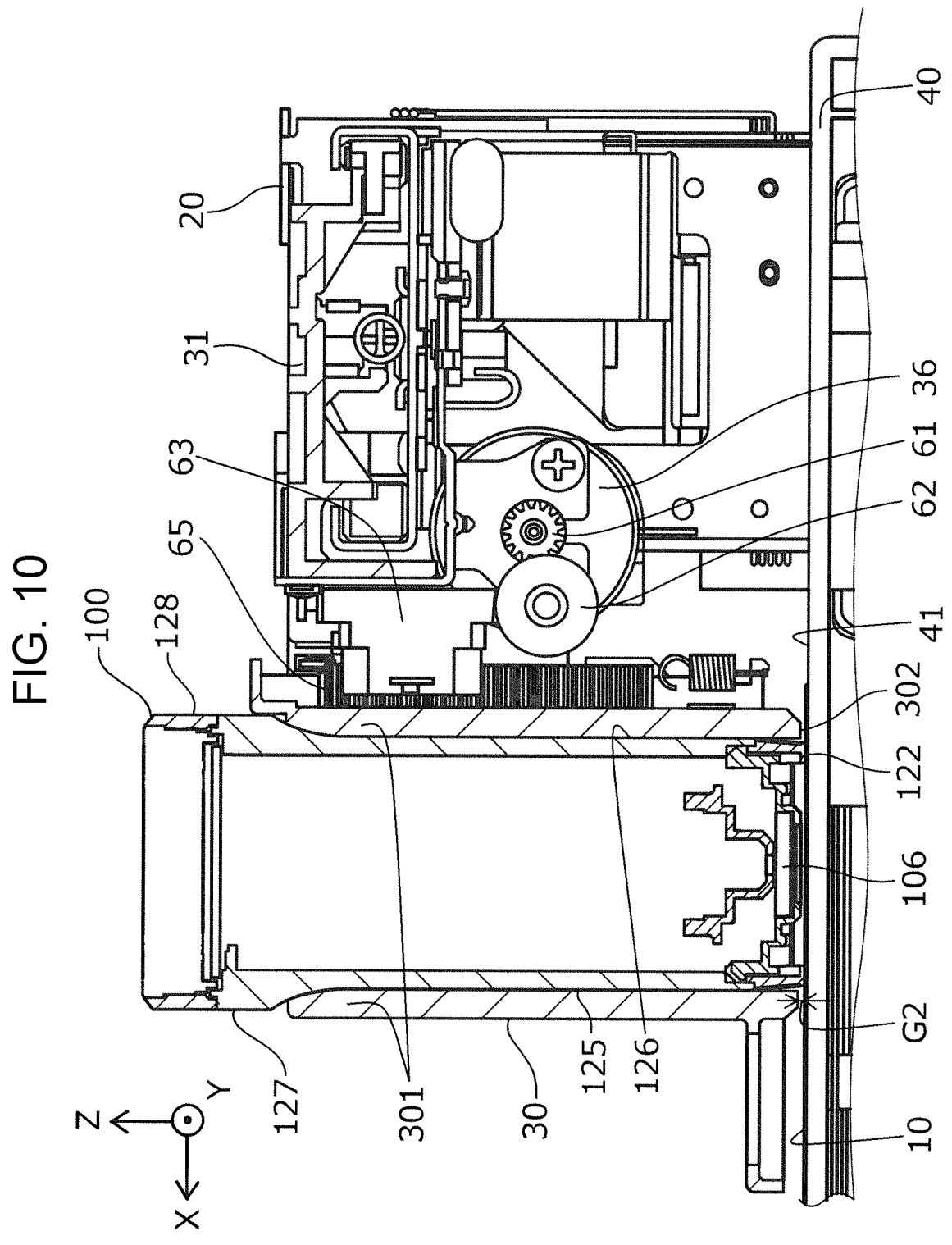
FIG. 10 is a rear view illustrating a periphery of the carriage of the color measurement apparatus according to the example of the present disclosure, and is a view illustrating a disposition when the colorimeter of FIG. 1 is accommodated, the carriage is further moved downward from the state of FIG. 9, and a color of the color measurement target is measured.

Therefore, as illustrated in FIG. 10, when the carriage 30 is further moved in the −Z direction from the state of FIG. 9, its own weight of the colorimeter 100 is applied to the color measurement surface 122. FIG. 10 illustrates a disposition when the color of the color measurement target is measured, that is, the disposition when the color of the color patch 11 and the black frame 12 of the color chart 10 is measured. For example, in the present example, the gap G2 in the Z-axis direction between the bottom surface 302 of the carriage 30 and the color chart 10 at this time is 1 mm. In other words, in the color measurement apparatus 1 of the present example, when the color of the color measurement target is measured, the color measurement surface 122 is in contact with the color measurement target, but the bottom surface 302 of the carriage 30 is in a state in which a gap is provided.

In the color measurement apparatus 1 of the present example, the color measurement is performed in a state in which the entire periphery of the color measurement surface 122 of the colorimeter 100 viewed from the Z-axis direction comes into contact with the color chart 10 on the support base 41 and follows the surface of the color chart 10. With such a configuration, color measurement can be performed in a state in which the color measurement port 106 that is an optical axis opening of the colorimeter 100 is covered with the color measurement surface 122, so that it is unlikely affected by external light and color measurement accuracy rises. Even in the state of FIG. 9, color measurement can be performed in a state of being unlikely to be affected by external light, but since the carriage 30, the colorimeter 100, and the support base 41 have a tolerance due to manufacturing variations in parts or the like, the holding position of the colorimeter 100 of the carriage 30 or the distance from the color measurement surface 122 to the support base 41 may deviate. However, by further lowering the carriage 30 from the state of FIG. 9, color measurement can be performed without being affected by such a tolerance.

In addition, in a state of FIG. 10, the gap G2 is provided between the bottom surface 302 of the carriage 30 and the color chart 10, and the bottom surface 302 of the carriage 30 and the color chart 10 are in a state of being separated from each other. Therefore, the weight of the carriage 30 is not transmitted to the color chart 10, and it is in a state in which only its own weight of the colorimeter 100 is applied to the color chart 10. Therefore, the colorimeter 100 is in contact with the color chart 10 in a state in which an appropriate load is applied, so that the color chart 10 is unlikely to be damaged. In a state in which the color measurement surface 122 of the colorimeter 100 is in contact with the color chart 10 to perform color measurement, since a predetermined load due to its own weight of the colorimeter 100 is applied to the color chart 10, the positional deviation of the color chart 10 can be suppressed.

Figure 11:
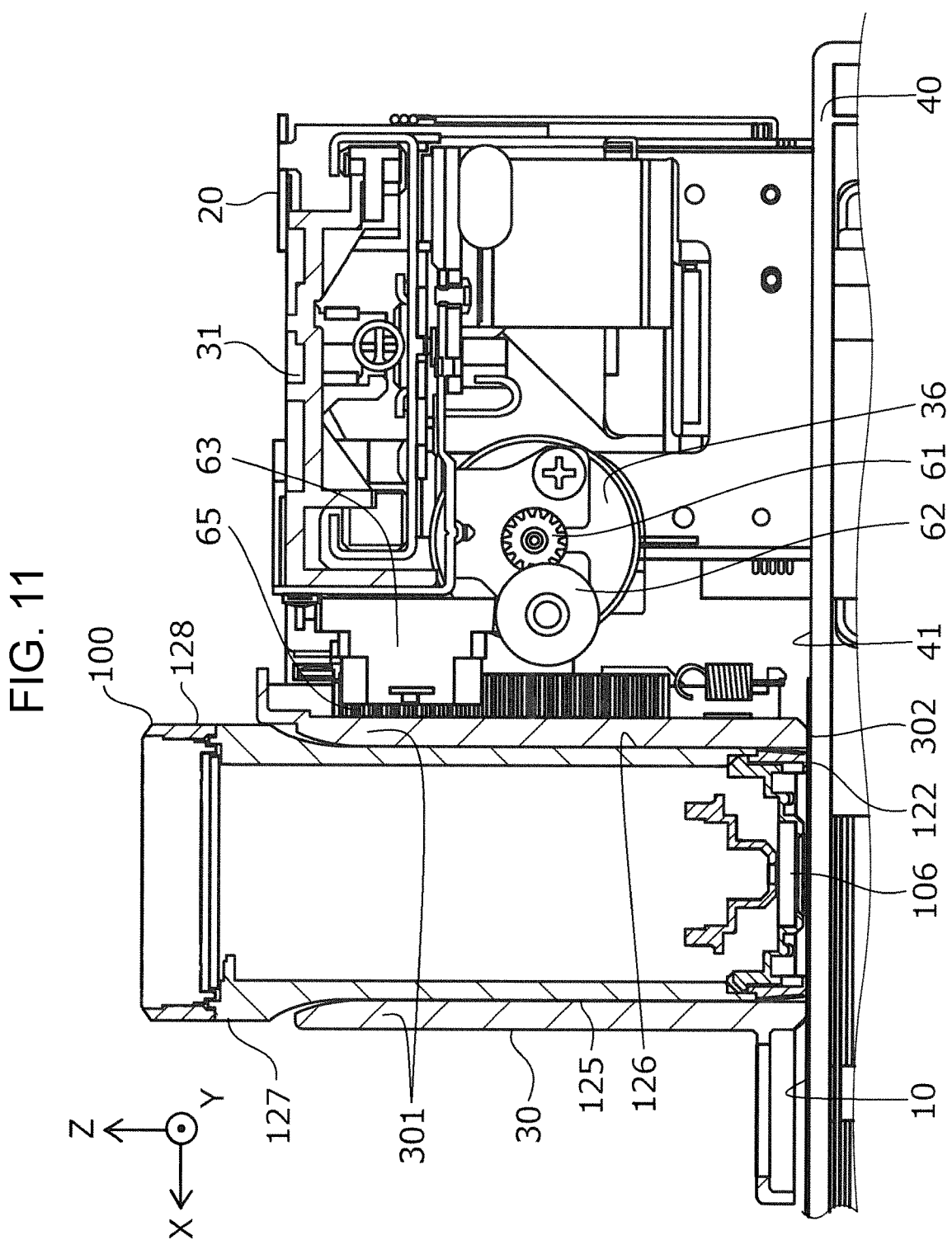
FIG. 11 is a rear view illustrating a periphery of the carriage of the color measurement apparatus according to the example of the present disclosure, and is a view illustrating a disposition when the colorimeter of FIG. 1 is accommodated, the carriage is further moved downward from the state of FIG. 10, and a bottom surface of the carriage comes into contact with the color measurement target.

The color measurement apparatus 1 of the present example can measure color of various color measurement targets. The color measurement target that can be color-measured by the color measurement apparatus 1 of the present example has various thicknesses. Therefore, the color measurement apparatus 1 of the present example brings the carriage 30 into contact with the color measurement target by moving the carriage 30 in the Z-axis direction with respect to the color measurement target to be used, and the abutting height, which is the height of the carriage 30 at the contact time, can be measured. Describing from another viewpoint, the abutting height of the carriage 30 is a height of the carriage 30 when the color measurement target is abutted. Specifically, in the color measurement apparatus 1 of the present example, in order to know the abutting height of the carriage 30, by bringing the bottom surface 302 of the carriage 30 in contact with the color measurement target and driving the Z-axis movement direction movement motor 36 to continue lowering the height of the carriage 30 until a threshold value at which the load of the Z-axis movement direction movement motor 36 is present is exceeded, the height exceeding the threshold value is measured, so that the abutting height of the carriage 30 can be known. FIG. 11 is a view illustrating a state when, in order to know the abutting height of the carriage 30, the bottom surface 302 of the carriage 30 abuts the color chart 10 that is a color measurement target and the threshold value at which the load of the Z-axis movement direction movement motor 36 is present is exceeded.

Figure 12:
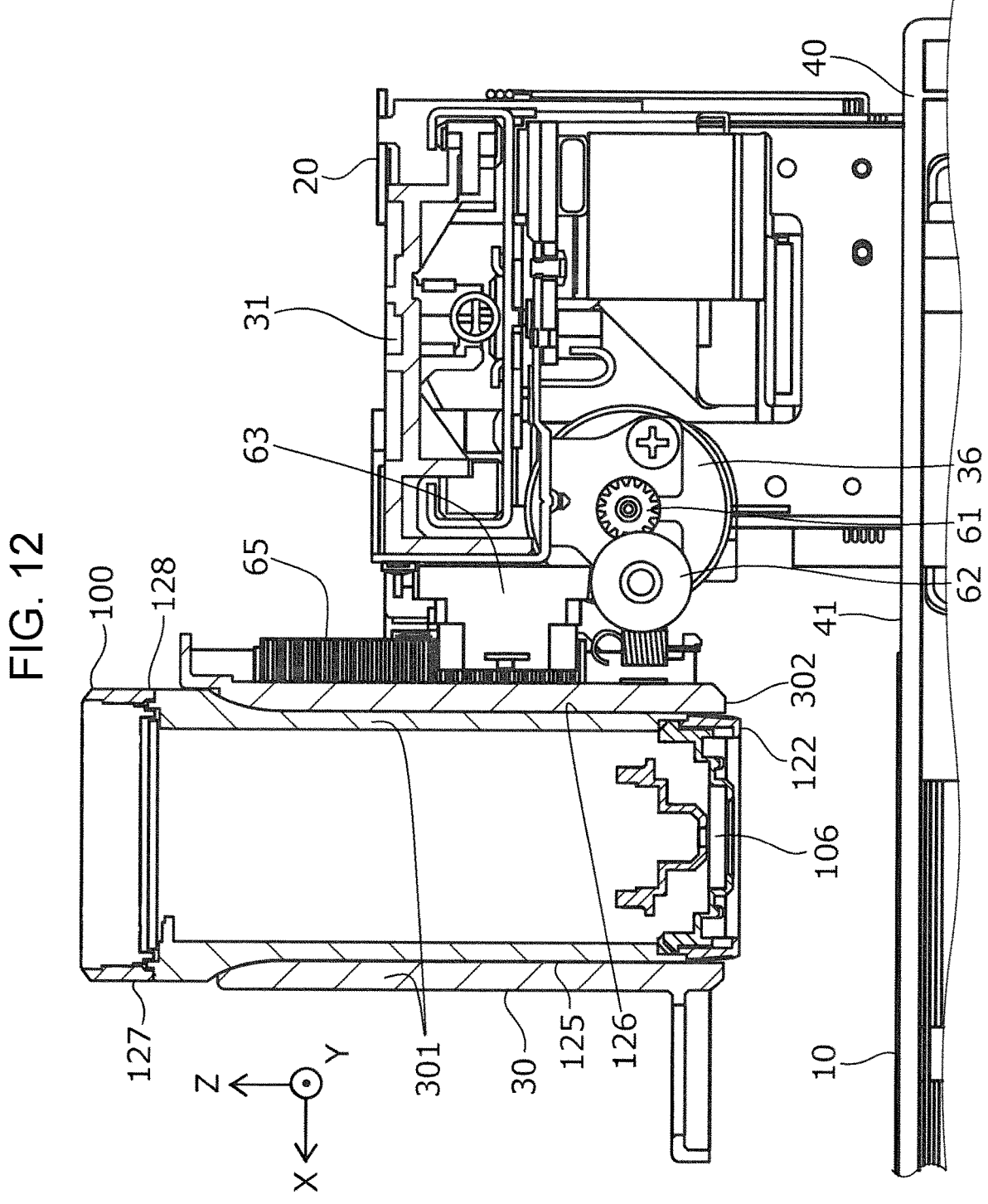
FIG. 12 is a rear view illustrating a periphery of the carriage of the color measurement apparatus according to the example of the present disclosure, and is a view illustrating a disposition in a state in which the colorimeter of FIG. 1 is accommodated and the carriage is moved to a home position.

In addition, as illustrated in FIG. 7, the color measurement apparatus 1 of the present example is provided with the home position sensor 39 that measures whether or not the position of the carriage 30 in the Z-axis direction with respect to the gantry 20 is a home position. FIG. 12 illustrates a state in which the carriage 30 is at the home position in the Z-axis direction.

Here, to be summarized, the color measurement apparatus 1 of the present example is a color measurement apparatus configured to attach the colorimeter 100 that measures the color of the color patch 11 of the color chart 10 in a state in which the color measurement surface 122 that is a color measurement portion of the colorimeter 100 is in contact with the color chart 10 that is a color measurement target. The carriage 30 that supports the colorimeter 100 and the gantry 20 that composes a scanning mechanism portion that causes the carriage 30 to perform scanning are included. In addition to the gantry 20, the carriage motor 22, the front pulley 24, the back pulley 25, the carriage belt 23, or the like can be included and regarded as a scanning mechanism portion. Here, the carriage 30 supports the colorimeter 100 such that, in a state of supporting the colorimeter 100, the color measurement surface 122 protrudes in the −Z direction from the bottom surface 302 of the carriage 30, that is, in a protruding direction toward the color chart 10.

In this manner, by adopting a configuration in which the colorimeter 100 that measures the color of the color chart 10 is configured to be attached in a state in which the color measurement surface 122 is in contact with the color chart 10, external light can be suppressed from entering through the gap between the color measurement surface 122 and the color chart 10, and a decrease in color measurement accuracy can be suppressed. In addition, the color measurement apparatus 1 of the present example is configured to support the colorimeter 100 such that the color measurement surface

122 protrudes from the bottom surface 302 of the carriage 30 in the −Z direction in a state in which the carriage 30 supports the colorimeter 100, and is configured to support the colorimeter 100 without being fixed to the carriage 30. Therefore, the impact generated when the color measurement surface 122 comes into contact with the color chart 10 can be attenuated, and the color measurement surface 122 can be suppressed from damaging the color chart 10.

In addition, in the color measurement apparatus 1 of the present example, the colorimeter 100 is supported by the carriage 30 in a state in which the projection portion 127 and the projection portion 128, which are portions of the colorimeter 100, are placed on the rib 301 by their own weights, with respect to a portion of the carriage 30, and is configured to be movable in the +Z direction with respect to the carriage 30 by applying a force to the color measurement surface 122 from a direction opposite to a protruding direction of the color measurement surface 122, that is, from the +Z direction. In this manner, since the color measurement apparatus 1 of the present example can support the colorimeter 100 with respect to the carriage 30 by its own weight of the colorimeter 100, the impact generated when the color measurement surface 122 comes into contact with the color chart 10 can be effectively attenuated, and the color measurement surface 122 can be effectively suppressed from damaging the color chart 10.

In addition, as illustrated in FIG. 10, in the color measurement apparatus 1 of the present example, the bottom surface 302 of the carriage 30 is separated from the color chart 10 in a state in which the color of the color chart 10 is measured on the color measurement surface 122. Therefore, the weight of the carriage 30 is not transmitted to the color chart 10 in a state in which the color of the color chart 10 is measured on the color measurement surface 122. Therefore, the color measurement apparatus 1 of the present example can effectively attenuate the impact generated when the color measurement surface 122 comes into contact with the color chart 10, and the color measurement surface 122 can be particularly effectively suppressed from damaging the color chart 10. In a state in which the color measurement surface 122 of the colorimeter 100 is in contact with the color chart 10 to perform color measurement, since a predetermined load due to its own weight of the colorimeter 100 is applied to the color chart 10, the positional deviation of the color chart 10 can be suppressed.

In addition, as illustrated in FIG. 8, in the color measurement apparatus 1 of the present example, a length L1 of the carriage 30 is shorter than a length L2 of the colorimeter 100 in the Z-axis direction. With such a configuration, the length of the carriage 30 in the Z-axis direction can be shortened, and the entirety of the color measurement apparatus 1 is miniaturized in the Z-axis direction.

In addition, in the color measurement apparatus 1 of the present example, the carriage 30 supports the projection portion 127 provided on the right surface 125 and the projection portion 128 provided on the left surface 126 of the colorimeter 100, by the rib 301. Describing from another perspective, the carriage 30 supports the colorimeter 100 by the rib 301 coming into contact with the right surface 125 that is a first side surface of the colorimeter 100 and the left surface 126 that is a second side surface facing the right surface 125. Therefore, in the color measurement apparatus 1 of the present example, the positional deviation of the colorimeter 100 in the X-axis direction, which is a direction intersecting the protruding direction of the color measurement surface 122, with respect to the carriage 30 can be suppressed by the right surface 125 and the left surface 126.

Figure 13:
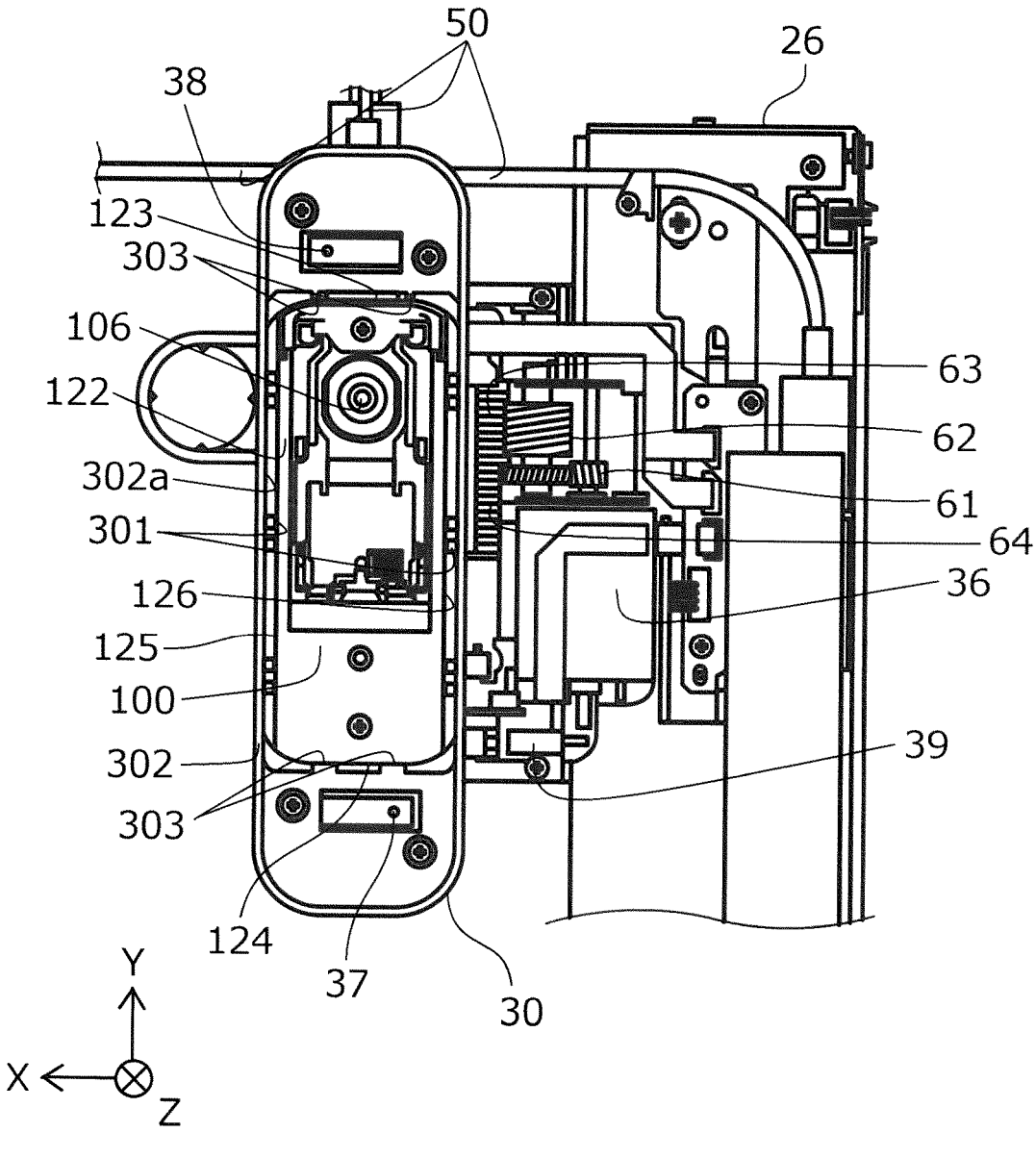
FIG. 13 is a bottom view illustrating a periphery of the carriage of the color measurement apparatus according to the example of the present disclosure, and is a view illustrating a state in which the colorimeter of FIG. 1 is accommodated.

In addition, as illustrated in FIG. 6, FIG. 7, and FIG. 13, in the color measurement apparatus 1 of the present example, the carriage 30 includes not only the rib 301 that comes into contact with the right surface 125 and the left surface 126 to support the colorimeter 100 and protrudes in the X-axis direction, but also the rib 303 that protrudes in the Y-axis direction and comes into contact with the rear surface 123 and the front surface 124 of the colorimeter 100. Therefore, in the color measurement apparatus 1 of the present example, the positional deviation of the colorimeter 100 also in the Y-axis direction, which is a direction intersecting the protruding direction of the color measurement surface 122, with respect to the carriage 30 can be suppressed.

In the color measurement apparatus 1 of the present example, the carriage 30 is in contact with the colorimeter 100 over a range from below to above by the rib 301 and the rib 303. By having the rib 301 or the rib 303 having such a configuration, the inclination of the colorimeter 100 can be suppressed with respect to the optical axis. However, the present example has a configuration in which the right surface 125, the left surface 126, the rear surface 123, and the front surface 124, which are the side surfaces of the colorimeter 100, are supported but the color measurement surface 122, which is the bottom surface, is not supported, but may be configured to support the bottom surface of the colorimeter 100.

In addition, when described from the viewpoint of the carriage 30, the carriage 30 of the present example supports the projection portion 127 that is provided on the right surface 125 of the colorimeter 100 and protrudes toward the outside of the colorimeter 100, and the projection portion 128 that is provided on the left surface 126 of the colorimeter 100 and protrudes toward the outside of the colorimeter 100. With such a configuration, the colorimeter can be stably supported in the protruding direction.

As illustrated in FIG. 8 to FIG. 12, in the color measurement apparatus 1 of the present example, the carriage 30 supports a portion above the center of the colorimeter 100 in the Z-axis direction. With such a configuration, a posture of the colorimeter 100 is likely to be stabilized. However, the present disclosure is not limited to this configuration.

Figure 14:
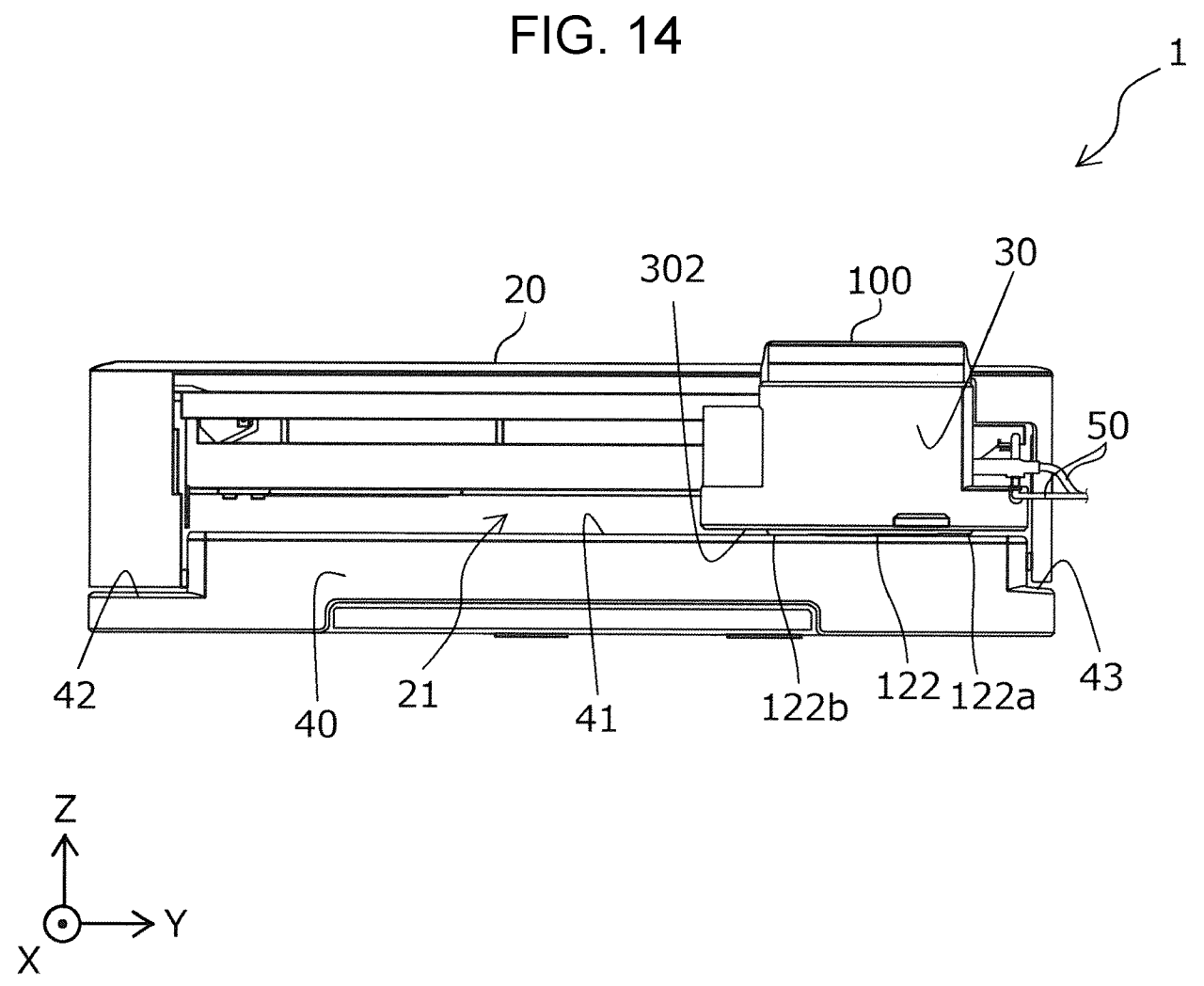

Here, FIG. 14 corresponds to the state of FIG. 9, and illustrates a disposition at the moment at which the color measurement surface 122 is in contact with the color chart 10. FIG. 14 illustrates a state in which at the moment at which the color measurement surface 122 is in contact with the color chart 10, a portion 122b of the color measurement surface 122 on the +Y direction side is in contact before a portion 122a of the color measurement surface 122 on the −Y direction side. In this manner, the colorimeter 100 may be configured to be in contact with the color chart 10 first from either the front side corresponding to the −Y direction side or the back side corresponding to the +Y direction side. With such a configuration, an impact sound generated when the colorimeter 100 touches the color chart 10 can be reduced.

In other words, the color measurement apparatus 1 of the present example is configured such that the gantry 20 is displaceable between a state in which the color measurement surface 122 is in contact with the color chart 10 and a state in which the color measurement surface 122 is not in contact with the color chart 10, and at the time of the displacement from a state in which the color measurement surface 122 is not in contact with the color chart 10 to a state in which the color measurement surface 122 is in contact with the color chart 10, one end of the color measurement surface 122 in the Y-axis direction that is the scanning direction in which the color measurement surface 122 is caused to perform scanning is brought into contact with the color chart 10 before the other end. With such a configuration, an impact sound generated when the colorimeter 100 is in contact with the color chart 10 can be reduced. A specific method for obtaining such a configuration is, for example, shifting the center of gravity of the carriage 30 or the colorimeter 100 from the center in the Y-axis direction, using a reaction force of the USB cable 50, shifting the position of the movement mechanism in the Z-axis direction of the carriage 30 with respect to the gantry 20 from the center in the Y-axis direction, causing the color measurement surface 122 of the colorimeter 100 to provide support slightly obliquely in advance with respect to the surface of the color chart 10 when viewed from the X-axis direction, or the like.

Figure 15:
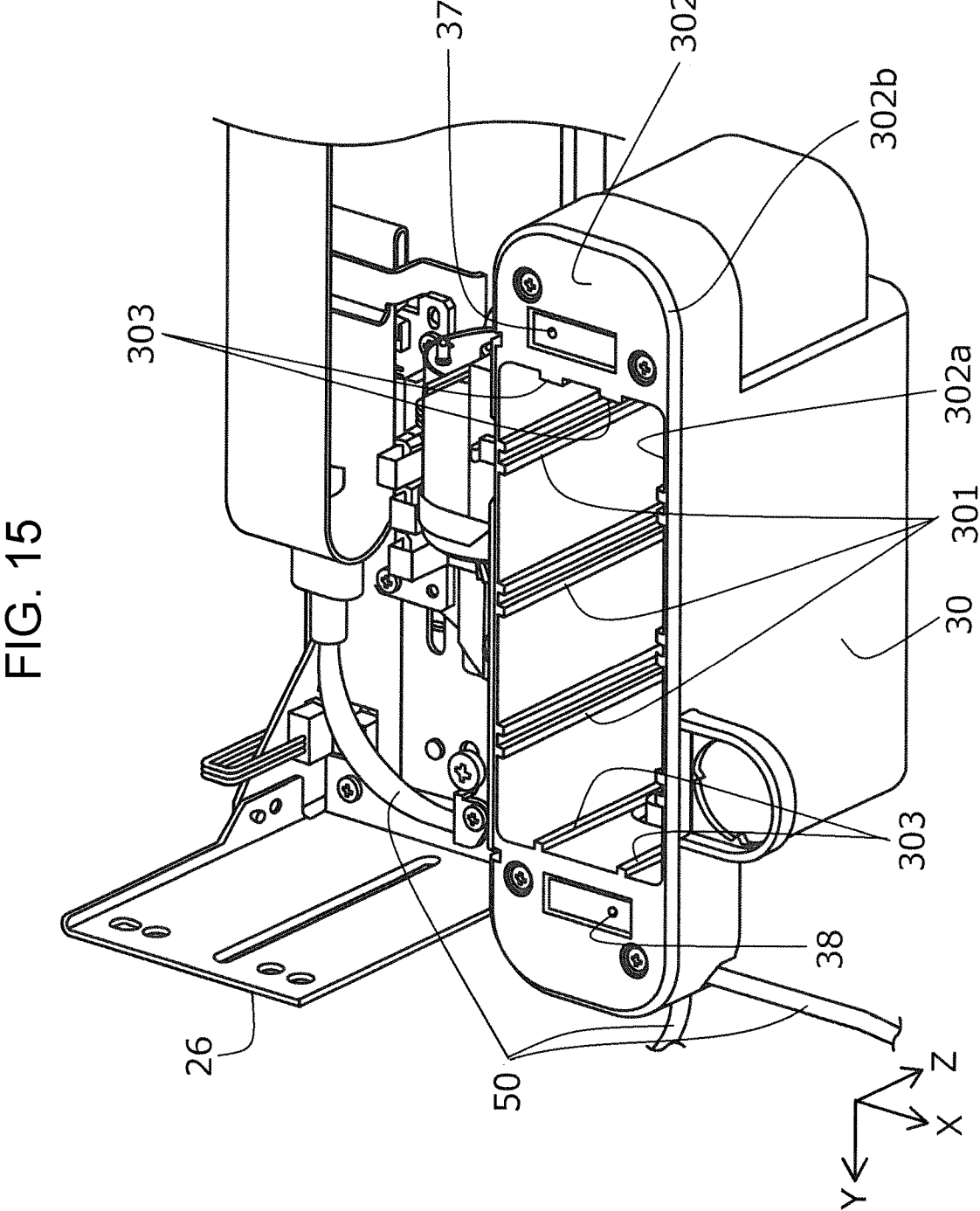
FIG. 15 is a perspective view illustrating a periphery of the carriage of the color measurement apparatus according to the example of the present disclosure when viewed from below.

FIG. 15 is a perspective view of a periphery of the carriage 30 when viewed from below, but as illustrated in FIG. 15, the bottom surface 302 of the carriage 30 has a planar shape, and an inclined shape 302b is provided in a periphery of the bottom surface 302 when viewed from the Z-axis direction. The bottom surface 302 of the carriage 30 has a planar shape and the inclined shape 302b is provided on the bottom surface 302, so that the height adjustment accuracy is improved when the carriage 30 abuts the color chart 10, and the color chart 10 can be effectively suppressed from being damaged when the carriage 30 is in contact with the color chart 10.

Figure 16:
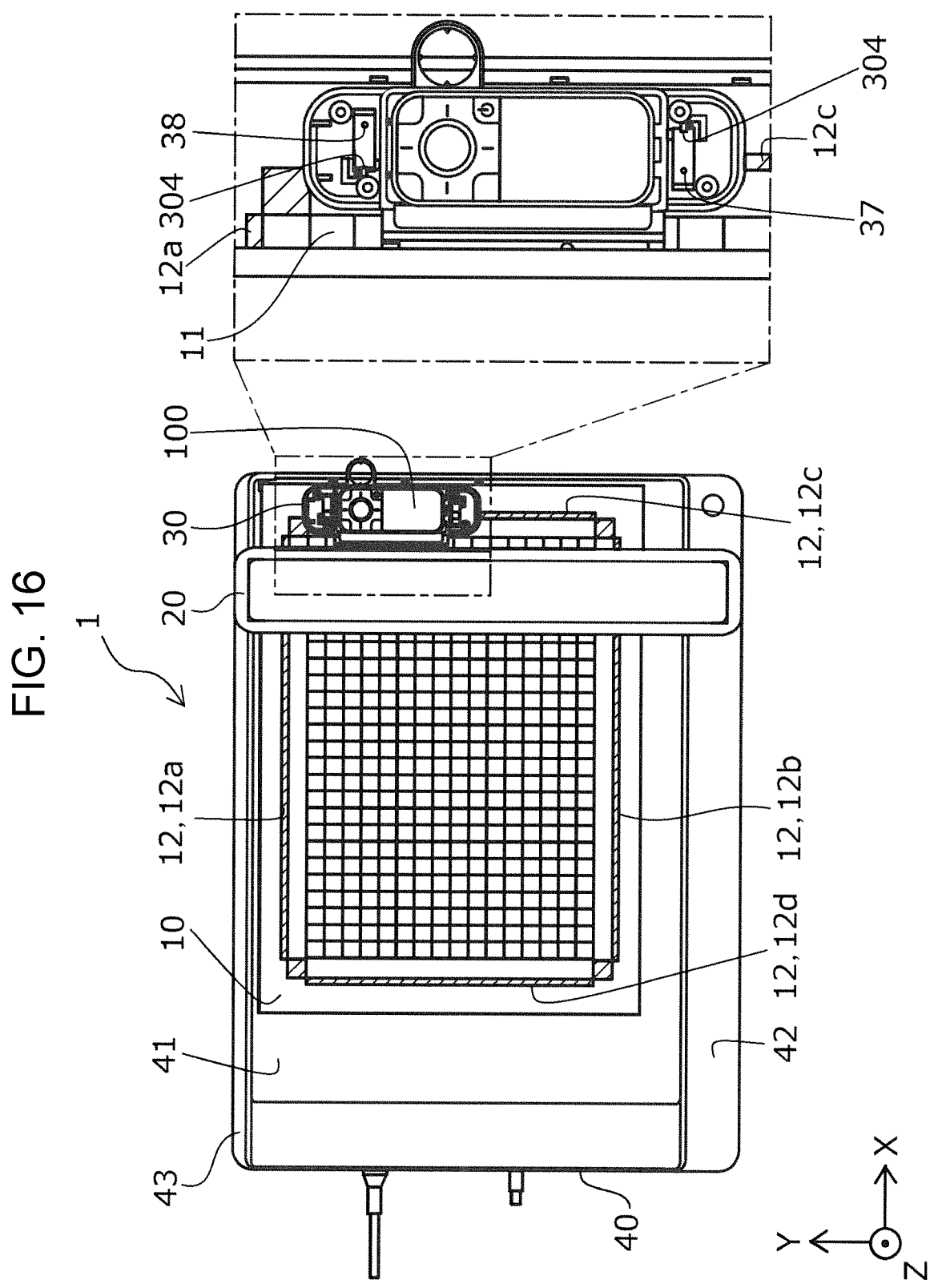
FIG. 16 is a plan view of the color measurement apparatus according to the example of the present disclosure, and is a view illustrating that the colorimeter of FIG. 1 is accommodated and a periphery of the carriage is enlarged.

FIG. 16 is a plan view of the color measurement apparatus 1 of the present example, and a view illustrating that the carriage 30 accommodates the colorimeter 100 and a periphery of the carriage 30 is enlarged. FIG. 16 illustrates a state in which the front side cover 34 and the rear side cover 35 are removed. As illustrated in FIG. 16, the carriage 30 includes the rear side sensor 38 as a first measurement portion that measures the color chart 10 and the front side sensor 37 as a second measurement portion. Here, the rear side sensor 38 and the front side sensor 37 can measure the black frame 12 of the color chart 10. The rear side sensor 38 and the front side sensor 37 are provided to sandwich the colorimeter 100 in the Y-axis direction.

That is, in the color measurement apparatus 1 of the present example, the carriage 30 includes the rear side sensor 38 and the front side sensor 37 that measure the black frame 12 of the color chart 10, so that the position of the colorimeter 100 can be specified with respect to the position of the color chart 10. In addition, since the rear side sensor 38 and the front side sensor 37 are provided to sandwich the colorimeter 100 in the Y-axis direction, the rear side sensor 38 can measure a black frame 12a in the black frame 12 and the front side sensor 37 can measure a black frame 12b in the black frame 12, so that the scanning range of the carriage 30 can be reduced in the Y-axis direction by efficiently measuring the black frame 12.

Further, as illustrated in FIG. 16, the rear side sensor 38 and the front side sensor 37 are provided with a color measurement position at deviated positions in the X-axis direction. Therefore, the rear side sensor 38 can measure a black frame 12c in the black frame 12 and the front side sensor 37 can measure a black frame 12d in the black frame 12, so that the scanning range of the gantry 20 can be reduced in the X-axis direction by efficiently measuring the black frame 12. In this manner, the color measurement apparatus 1 is miniaturized by reducing the scanning ranges in the X-axis direction and the Y-axis direction.

The rear side sensor 38 and the front side sensor 37 of the present example are reflection type optical sensors, and the type of the sensors is not particularly limited as long as the position of the color chart 10 can be measured. Specifically, both the rear side sensor 38 and the front side sensor 37 of the present example measures the amount of light reflected from the target by converting the amount of light, which is emitted from a light emitting portion, hits the target, and enters a light receiving portion, into a current value or voltage value, and in the present example, the position of the color chart 10 is measured from the contrast between the black frame 12 and the white area which is the other area.

Figure 17:
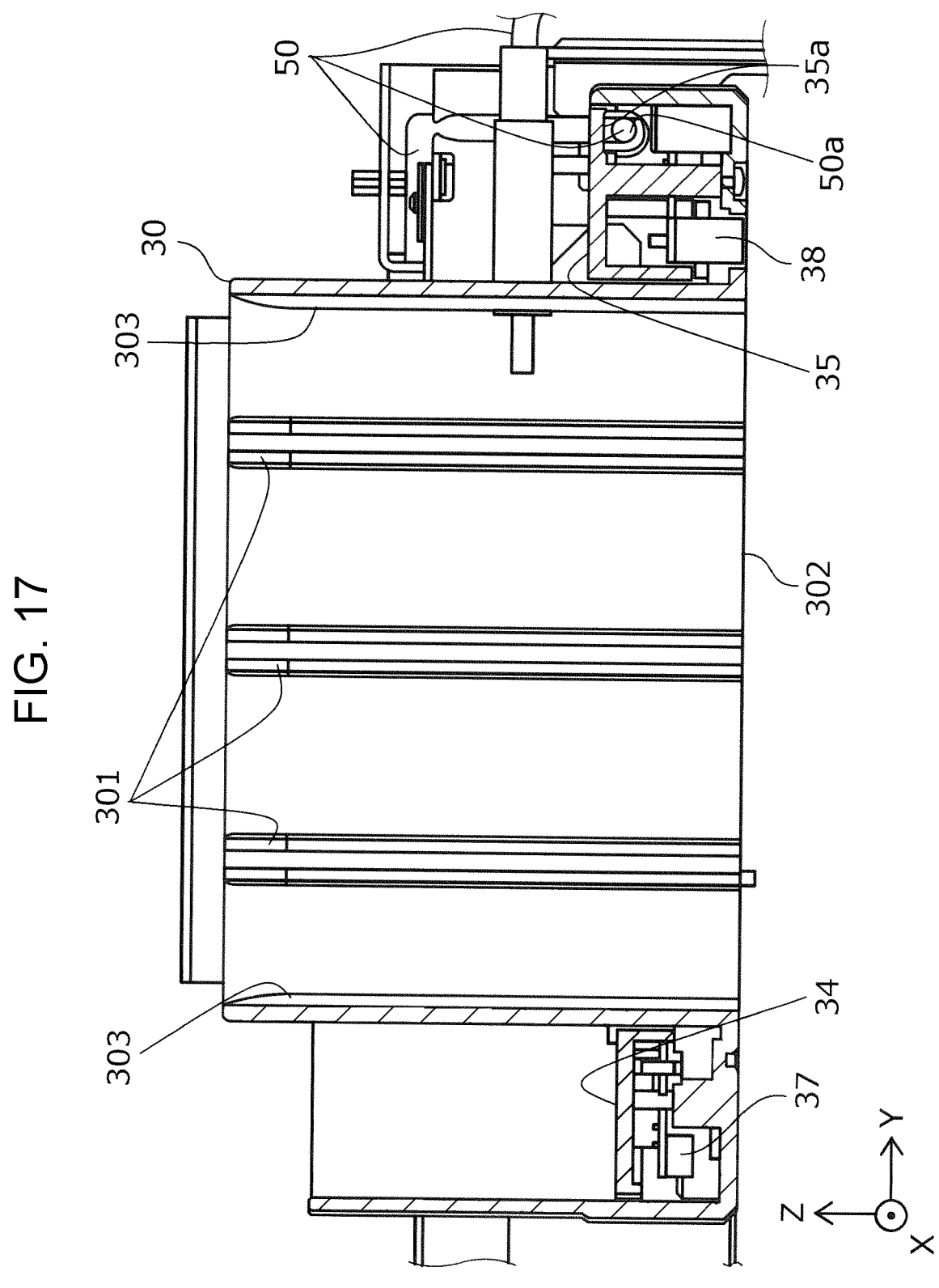
FIG. 17 is a side sectional view illustrating the carriage of the color measurement apparatus according to the example of the present disclosure.

FIG. 17 is a side sectional view of the carriage 30, but as illustrated in FIGS. 6 and 17, the color measurement apparatus 1 according to the present example includes the front side cover 34 and the rear side cover 35 as covers composing the outer surface of the color measurement apparatus 1. Here, the rear side cover 35 is a first cover that covers the rear side sensor 38 as a first measurement portion, and is configured such that the rear side sensor 38 can be fixed. Therefore, the rear side cover 35 can protect the rear side sensor 38 when composing the outer surface of the color measurement apparatus 1. That is, since one member has two jobs, the number of members can be reduced as compared with the configuration in which separate members are provided.

In addition, the front side cover 34 is a second cover that covers the front side sensor 37 as a second measurement portion, and is configured such that the front side sensor 37 can be fixed. Therefore, the front side cover 34 can protect the front side sensor 37 when composing the outer surface of the color measurement apparatus 1. That is, since one member has two jobs, the number of members can be reduced as compared with the configuration in which separate members are provided. In the present example, both the front side cover 34 covering the front side sensor 37 and the rear side cover 35 covering the rear side sensor 38 are provided, but only one of these may be provided.

For example, as illustrated in FIG. 7, in the carriage 30 of the present example, since the bottom surface 302 is disposed over a position facing the front side cover 34 and a position facing the rear side cover 35, the front side sensor 37 and the rear side sensor 38 are in a state of being sandwiched between the front side cover 34 and the rear side cover 35 and the bottom surface 302. Therefore, a state is obtained in which the user cannot touch the accommodation positions of the front side sensor 37 and the rear side sensor 38, and the electronic components are not visible from the outside, so that the product appearance is improved.

As illustrated in FIG. 16, protrusions 304 are provided at an accommodation position of the front side sensor 37 and an accommodation position of the rear side sensor 38 in the carriage 30. Both the front side sensor 37 and the rear side sensor 38 can be disposed in the carriage 30 by pushing both the front side sensor 37 and the rear side sensor 38 from the upper side to the lower side to the respective accommodation positions, and have a so-called snap-fit structure in which the protrusion 304 presses from the upper side when disposed at the respective accommodation positions. With such a structure, the assembling property of the carriage 30 for the front side sensor 37 and the rear side sensor 38 is improved.

Here, in the present example, the front side sensor 37 and the rear side sensor 38 are disposed at substantially the same position in the Z-axis direction, but the positions of the front side sensor 37 and the rear side sensor 38 in the Z-axis direction may be changed. With such a configuration, a plurality of optimum measurement distances of the sensors can be obtained, so that the measurement range is widened, and the measurement accuracy is improved. In other words, depending on the combination of the sensor and the color measurement target, the sensor may not be able to measure when the sensor is too close to the color measurement target, so that when a plurality of sensors at different positions in the Z-axis direction are provided, the types of color measurement targets that can be measured and supported can be increased.

In addition, the positions of the front side sensor 37 and the rear side sensor 38 may be configured to, for example, be movable and adjustable from the outside of the color measurement apparatus 1. With such a configuration, an optimum position of the sensor that coincides with the color measurement target to be used can be realized. In other words, when a color measurement target that is wide in the X-axis direction and the Y-axis direction can be used without increasing the size of the color measurement apparatus 1, the positions of the front side sensor 37 and the rear side sensor 38 as in the present example may be disposed substantially diagonally with respect to the hole portion 302a when viewed from the Z-axis direction, but on the contrary, the measurement error can be reduced for one closer to the optical axis of the colorimeter 100, so that an optimum sensor position can be selectively used depending on a usage situation of the color measurement apparatus 1. As a specific configuration, for example, a screw position is configured to be adjustable from the outside of the color measurement apparatus 1 by a driver or the like, so that the serviceman or the user can adjust the position.

In addition, as illustrated in FIG. 17, the rear side cover 35 is provided with a holding portion 35a that holds a portion 50a of the USB cable 50. In other words, the rear side cover 35 is configured such that a cable coupled to the colorimeter 100 can be held. With such a configuration, since the rear side sensor 38 and the cable can be held by one member, the number of components can be reduced. For example, a slidable member having a low friction coefficient may be disposed in the holding portion 35a such that an external force or the like is easily escaped when the external force or the like is applied to the USB cable 50.

In the color measurement apparatus 1 of the present example, the rear side cover 35 holds the rear side sensor 38 and the USB cable 50 to overlap the rear side sensor 38 and the USB cable 50 in the Z-axis direction. In the present example, the rear side cover 35 fixes the rear side sensor 38 and the USB cable 50 to the carriage 30. In this manner, by disposing the rear side cover 35 to overlap the rear side sensor 38 and the USB cable 50 in the Z-axis direction, the accommodation space of the rear side sensor 38 can be reduced, and the carriage 30 can be miniaturized.

Here, the USB cable 50 is coupled to the colorimeter 100 in a state of being accommodated in the carriage 30, but as illustrated in FIG. 5 or the like, the carriage 30 includes an opening portion 305 through which the USB cable 50 passes, and the USB cable 50 is disposed in a state in which a gap is vacant with respect to the opening portion 305, that is, is disposed to be displaceable. When one end side of the USB cable 50, which is the side coupled to the colorimeter 100, moves in accordance with the fluctuation of the colorimeter 100, a force is applied to the USB cable 50 when the other end side of the USB cable 50 is configured to be fixed. However, since the USB cable 50 is disposed to be displaceable with respect to the opening portion 305, although one end side of the USB cable 50 moves in accordance with the fluctuation of the colorimeter 100, the USB cable 50 is displaced with respect to the opening portion 305, so that a force applied to the USB cable 50 can be escaped.

In addition, for example, a slidable member having a low friction coefficient may be disposed in the opening portion 305 such that a force applied to the USB cable 50 can be easily escaped. In addition, in the present example, the length of the USB cable 50 can be increased by routing the USB cable 50 in one rotation when viewed from the Z-axis direction. Therefore, the movable amount of the USB cable 50 increases. In this manner, the force applied to the USB cable 50 can be particularly reduced.

Figure 18:
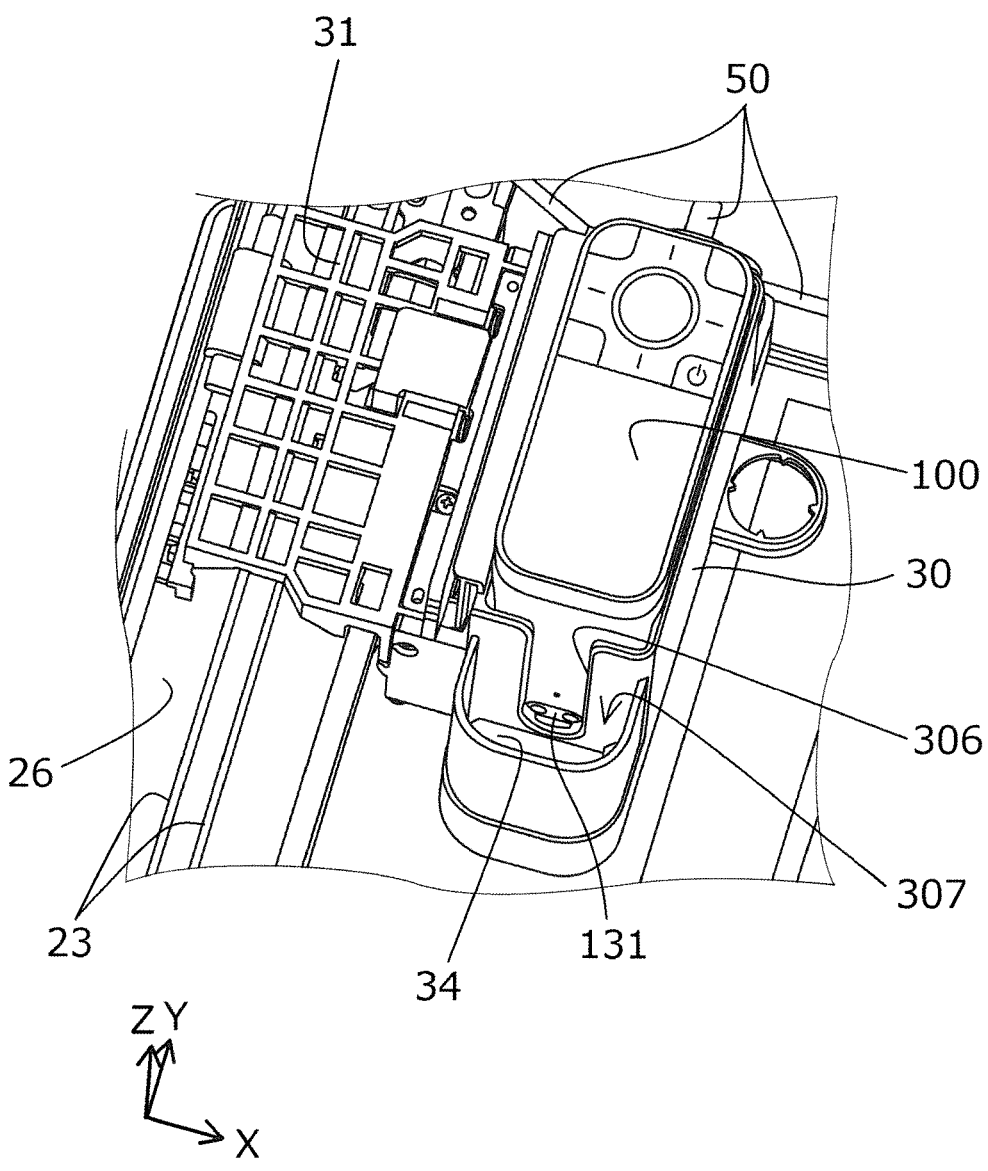
FIG. 18 is a perspective view from above of a periphery of the carriage of the color measurement apparatus according to the example of the present disclosure when viewed from an angle different from that of FIG. 5, and a view illustrating a state in which the colorimeter of FIG. 1 is accommodated.
Figure 19:
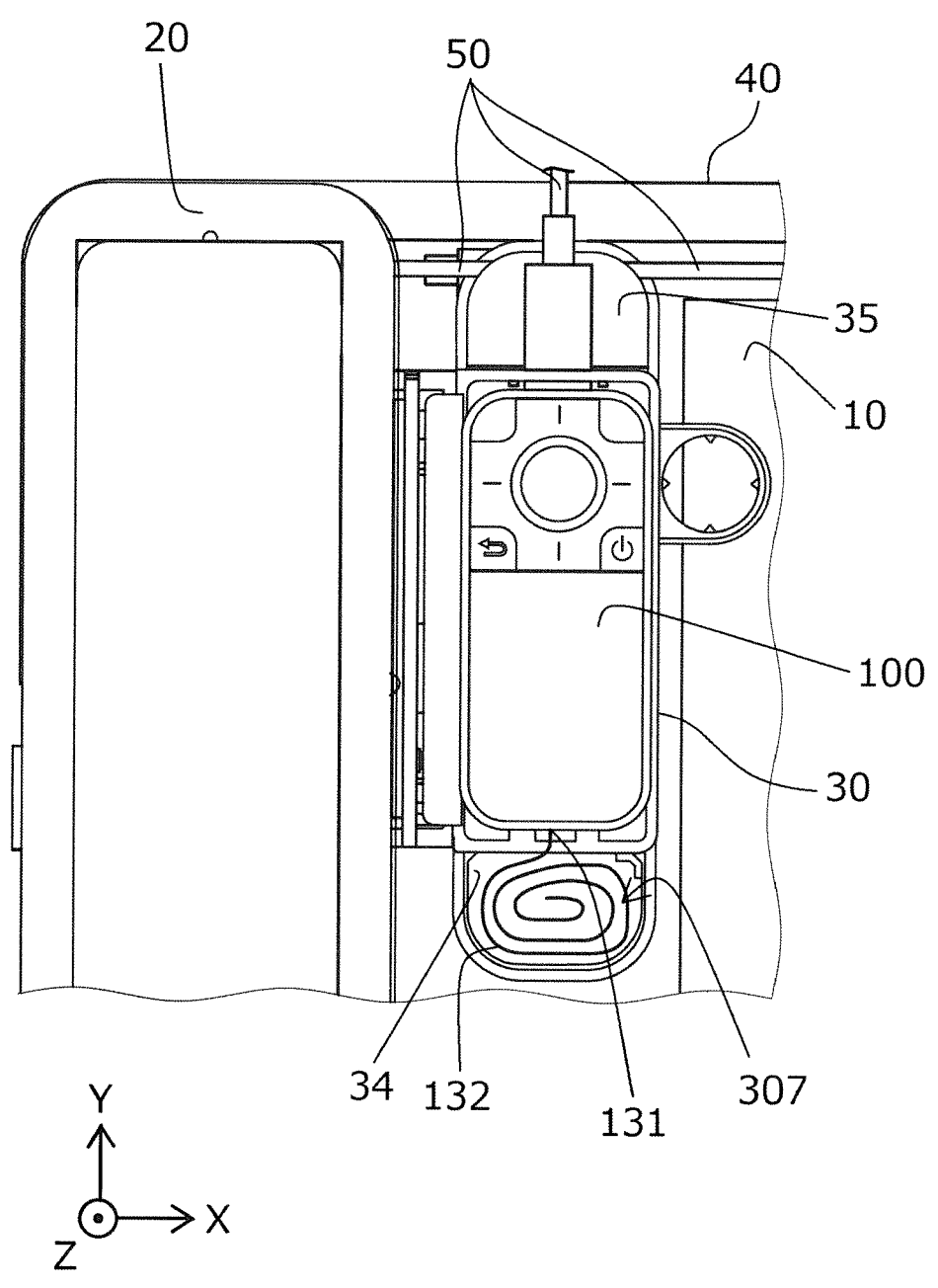
FIG. 19 is a plan view illustrating a periphery of the carriage of the color measurement apparatus according to the example of the present disclosure, and a view illustrating a state of accommodating the colorimeter of FIG. 1 to which a strap is attached.

FIG. 18 is a perspective view from above of a periphery of the carriage 30 of the color measurement apparatus 1 and is a view illustrating a state in which the colorimeter 100 is accommodated in the carriage 30, and FIG. 19 is a plan view illustrating a periphery of the carriage 30 of the color measurement apparatus 1, and is a view illustrating a state in which the colorimeter 100 is accommodated. Here, the colorimeter 100 is configured such that a strap 132 can be attached, and FIG. 19 illustrates a state in which the strap 132 is attached to the colorimeter 100. The strap 132 is an example of an attachment member attached to the colorimeter 100.

As illustrated in FIG. 18, the colorimeter 100 includes a strap attaching portion 131 having a hole opened for attaching the strap 132. The carriage 30 is provided with a notch portion 306 that exposes the strap attaching portion 131 when the colorimeter 100 is accommodated in the carriage 30. As illustrated in FIG. 19, when the strap 132 is attached to the colorimeter 100, a configuration is provided such that the strap 132 can be disposed at the accommodation portion 307 corresponding to the upper portion of the front side cover 34 via the notch portion 306.

In other words, as illustrated in FIGS. 18 and 19, in the color measurement apparatus 1 of the present example, the carriage 30 includes an accommodation portion 307 that accommodates the strap 132 attached to the colorimeter 100. Therefore, in the color measurement apparatus 1 of the present example, the colorimeter 100 can be set in the carriage 30 without removing the strap 132 from the colorimeter 100, so that usability is improved.

In the present example, since the strap 132 is configured to be disposed on the −Y direction side when the colorimeter 100 is accommodated in the carriage 30, the accommodation portion 307 is provided above the front side cover 34. However, for example, when the colorimeter 100 is accommodated in the carriage 30 and the strap 132 is configured to be disposed on the +Y direction side, the accommodation portion 307 may be provided above the rear side cover 35. In addition, the accommodation portion 307 of the present example has a configuration in which a direction intersecting with the Z-axis direction is surrounded, so that a case where the strap 132 falls onto the color chart 10 or comes into contact with other components during color measurement can be prevented from occurring. Therefore, the strap 132 can be suppressed from interfering with the color measurement operation during color measurement. As another example, for example, the carriage 30 may be provided with an L-shaped hook shape, and a structure may be provided in which a ring portion attached to the strap 132 is caught and placed thereon. In this way, the carriage 30 can be suppressed from being increased.

The present example can be also changed to the following aspects. For example, the rear side sensor 38 and the USB cable 50 may be provided to overlap each other in the Z-axis direction. With the present configuration, the carriage can be further miniaturized in the Z-axis direction. In addition, the rear side cover 35 may hold the USB cable 50 such that the USB cable 50 is slidable with respect to the rear side cover

35. The force applied to the USB cable 50 due to the fluctuations of the carriage 30 and the colorimeter 100 can be reduced. In addition, for example, a slidable member having a small coefficient of friction can be also provided at a position at which the USB cable 50 is held in the rear side cover 35.

The present disclosure is not limited to the above-described examples, and can be realized in various configurations without departing from the gist of the present disclosure. For example, technical features in the examples corresponding to technical features in each form described in a column of the outline of the disclosure can be appropriately replaced or combined to partially or entirely solve the above-described problems, or to partially or entirely achieve the above-described advantageous effects. In addition, unless the technical features are described as essential in the present specification, deletion is possible as appropriate.

What is claimed is:

1. A color measurement apparatus to which a colorimeter that measures a color of a color measurement target is configured to be attached in a state in which a color measurement portion is in contact with the color measurement target, the color measurement apparatus comprising:

a carriage that supports the colorimeter, wherein
the carriage is in contact with a first side surface of the colorimeter and a second side surface of the colorimeter to support the colorimeter,
the second side surface faces the first side surface, and
the carriage includes a rib that protrudes toward the first side surface and the second side surface; and a scanning mechanism portion that causes the carriage to perform scanning, wherein
the carriage supports the colorimeter such that the color measurement portion protrudes from a bottom surface of the carriage in a protruding direction toward the color measurement target in a state in which the colorimeter is supported,
the colorimeter is supported by the carriage in a state in which a portion of the colorimeter is placed on a portion of the carriage by own weight of the colorimeter,
by an application of a force to the color measurement portion from an opposite direction with respect to the protruding direction, the colorimeter is configured to be movable in the opposite direction with respect to the carriage, and
the bottom surface of the carriage is separated from the color measurement target in a state in which the color measurement portion measures the color of the color measurement target.

2. The color measurement apparatus according to claim 1, wherein
a length of the carriage is shorter than a length of the colorimeter in the protruding direction.

3. The color measurement apparatus according to claim 1, wherein
the carriage further includes a first measurement portion and a second measurement portion,
each of the first measurement portion and the second measurement portion measures the color measurement target, and
the first measurement portion and the second measurement portion are provided to sandwich the color measurement portion.

4. The color measurement apparatus according to claim 3, further comprising a first cover that constitutes an outer surface of the color measurement apparatus, wherein the first cover is configured to fix the first measurement portion.

5. The color measurement apparatus according to claim 4, wherein the first cover is configured to hold a cable coupled to the colorimeter.

6. The color measurement apparatus according to claim 5, wherein the first cover holds the first measurement portion and the cable to overlap the first measurement portion and the cable in the protruding direction.

7. The color measurement apparatus according to claim 1, further comprising a cable coupling to the colorimeter, wherein the carriage further includes an opening portion through which the cable passes, and the cable is disposed to be displaceable with respect to the opening portion.

8. The color measurement apparatus according to claim 1, wherein the carriage further includes an accommodation portion that accommodates an auxiliary member attached to the colorimeter.

9. The color measurement apparatus according to claim 1, wherein the scanning mechanism portion;

is configured to be displaced between the state in which the color measurement portion is in contact with the color measurement target and a state in which the color measurement portion is not in contact with the color measurement target; and brings a first end of the color measurement portion into contact with the color measurement target before a second end of the color measurement portion, wherein the scanning mechanism portion brings the first end of the color measurement portion into contact with the color measurement target in a scanning direction in which the color measurement portion is caused to perform scanning during displacement from the state in which the color measurement portion is not in contact with the color measurement target to the state in which the color measurement portion is in contact with the color measurement target.

10. A color measurement apparatus to which a colorimeter that measures a color of a color measurement target is configured to be attached in a state in which a color measurement portion is in contact with the color measurement target, the color measurement apparatus comprising:

a carriage that supports the colorimeter, wherein the carriage is in contact with a first side surface of the colorimeter and a second side surface of the colorimeter to support the colorimeter, the second side surface faces the first side surface, the carriage supports a projection portion that is provided on the first side surface and the second side surface, and the projection portion protrudes toward an outside of the colorimeter; and a scanning mechanism portion that causes the carriage to perform scanning, wherein the carriage supports the colorimeter such that the color measurement portion protrudes from a bottom surface of the carriage in a protruding direction toward the color measurement target in a state in which the colorimeter is supported, the colorimeter is supported by the carriage in a state in which a portion of the colorimeter is placed on a portion of the carriage by own weight of the colorimeter, by an application of a force to the color measurement portion from an opposite direction with respect to the protruding direction, the colorimeter is configured to be movable in the opposite direction with respect to the carriage, and the bottom surface of the carriage is separated from the color measurement target in a state in which the color measurement portion measures the color of the color measurement target.

11. The color measurement apparatus according to claim 10, wherein a length of the carriage is shorter than a length of the colorimeter in the protruding direction.

12. The color measurement apparatus according to claim 10, wherein the carriage includes a first measurement portion and a second measurement portion, each of the first measurement portion and the second measurement portion measures the color measurement target, and the first measurement portion and the second measurement portion are provided to sandwich the color measurement portion.

13. The color measurement apparatus according to claim 12, further comprising a first cover that constitutes an outer surface of the color measurement apparatus, wherein the first cover is configured to fix the first measurement portion.

14. The color measurement apparatus according to claim 13, wherein the first cover is configured to hold a cable coupled to the colorimeter.

15. The color measurement apparatus according to claim 14, wherein the first cover holds the first measurement portion and the cable to overlap the first measurement portion and the cable in the protruding direction.

16. The color measurement apparatus according to claim 10, further comprising a cable coupling to the colorimeter, wherein the carriage includes an opening portion through which the cable passes, and the cable is disposed to be displaceable with respect to the opening portion.

17. The color measurement apparatus according to claim 10, wherein the carriage includes an accommodation portion that accommodates an auxiliary member attached to the colorimeter.

18. The color measurement apparatus according to claim 10, wherein the scanning mechanism portion:

is configured to be displaced between the state in which the color measurement portion is in contact with the color measurement target and a state in which the color measurement portion is not in contact with the color measurement target; and brings a first end of the color measurement portion into contact with the color measurement target before a second end of the color measurement portion, wherein the scanning mechanism portion brings the first end of the color measurement portion into contact with the color measurement target in a scanning direction in which the color measurement portion is caused to perform scanning during displacement from the state in which the color measurement portion is not in contact with the color measurement target to the state in which the color measurement portion is in contact with the color measurement target.

* * * * *